US006272088B1

(12) United States Patent
Aramaki et al.

(10) Patent No.: US 6,272,088 B1
(45) Date of Patent: Aug. 7, 2001

(54) RECORDING APPARATUS AND RECORDING METHOD

(75) Inventors: Junichi Aramaki, Chiba; Natsumi Saito, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/315,235

(22) Filed: May 20, 1999

(30) Foreign Application Priority Data

May 29, 1998 (JP) ........................................ 10-149589

(51) Int. Cl.[7] ........................................ G11B 3/90

(52) U.S. Cl. ........................................ 369/53.24; 369/47.23

(58) Field of Search ........................................ 369/32, 33, 47.12, 369/47.13, 47.15, 47.3, 47.23, 47.24, 47.28, 47.31, 47.49, 47.54, 53.34, 53.37, 53.39, 53.44, 53.45, 84, 85, 96, 53.24

(56) References Cited

U.S. PATENT DOCUMENTS 5,889,747 * 3/1999 Hisamatsu et al. .................... 369/84
5,943,311 * 8/1999 Takenaka .............................. 369/84
5,963,521 * 10/1999 Nagashima et al. ............... 369/84 X
6,137,642 * 10/2000 Inoue ................................ 369/84 X

* cited by examiner

*Primary Examiner*—Paul W. Huber
(74) *Attorney, Agent, or Firm*—Oblon, Spivak, McClelland, Maier & Neustadt, PC

(57) ABSTRACT

A recording/playback apparatus provided by the present invention comprises at least two recording/playback units. When the size of a recordable area left in a recording medium mounted on one of the recording/playback units undergoing a recording operation first is detected to become equal to or smaller than a predetermined value, a recording operation is started in the other recording/playback unit so that it is possible to obtain a recording result without losing information due to replacement of a recording medium.

20 Claims, 14 Drawing Sheets

FIG. 2

| | | 16bits | | 16bits | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 11111111 | 2 |
| HEADER | | ClusterH | ClusterL | Sector(00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| PART-DESCRIPTOR-POINTER TABLE | | Disc ID | | P-DFA | P-EMPTY | 11 |
| PART-DESCRIPTOR-POINTER TABLE | | P-FRA | P-TNO1 | P-TNO2 | P-TNO3 | 12 |
| PART-DESCRIPTOR-POINTER TABLE | | P-TNO4 | P-TNO5 | P-TNO6 | P-TNO7 | 13 |
| PART-DESCRIPTOR-POINTER TABLE | | … | … | … | … | |
| PART-DESCRIPTOR-POINTER TABLE | | P-TNO248 | P-TNO249 | P-TNO250 | P-TNO251 | 74 |
| PART-DESCRIPTOR-POINTER TABLE | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| PART-DESCRIPTOR TABLE (255 PART DESCRIPTORS) | (01h) | START ADDRESS | | | TRACK MODE | 78 |
| | | END ADDRESS | | | LINK INFORMATION | 79 |
| | (02h) | START ADDRESS | | | TRACK MODE | 80 |
| | | END ADDRESS | | | LINK INFORMATION | 81 |
| | (03h) | START ADDRESS | | | TRACK MODE | 82 |
| | | END ADDRESS | | | LINK INFORMATION | 83 |
| | | … | | | … | |
| | (FCh) | START ADDRESS | | | TRACK MODE | 580 |
| | | END ADDRESS | | | LINK INFORMATION | 581 |
| | (FDh) | START ADDRESS | | | TRACK MODE | 582 |
| | | END ADDRESS | | | LINK INFORMATION | 583 |
| | (FEh) | START ADDRESS | | | TRACK MODE | 584 |
| | | END ADDRESS | | | LINK INFORMATION | 585 |
| | (FFh) | START ADDRESS | | | TRACK MODE | 586 |
| | | END ADDRESS | | | LINK INFORMATION | 587 |

FIG.5A

PART-DESCRIPTOR-POINTER TABLE
(PART-DESCRIPTOR POINTERS)

| | | |
|---|---|---|
| P-DFA: - | P-EMPTY:07h | P-FRA:06h |
| P-TNO1:01h | P-TNO2:02h | P-TNO3:03h |
| P-TNO4:05h | P-TNO5: - | P-TNO6: - |
| P-TNO7: - | P-TNO8: - | P-TNO9: - |
| P-TNO253: - | P-TNO254: - | P-TNO255: - |

FIG.5B

PART-DESCRIPTOR TABLE
(255 PART DESCRIPTORS)

| | START ADDRESS | END ADDRESS | TRACK MODE | LINK INFORMATION |
|---|---|---|---|---|
| (01h) | A0 | A1 | | - |
| (02h) | A2 | A3 | | 04h |
| (03h) | A4 | A5 | | - |
| (04h) | A6 | A7 | | - |
| (05h) | A8 | A9 | | - |
| (06h) | A10 | A11 | | - |
| (07h) | - | - | | 08h |
| (08h) | - | - | | 09h |
| (09h) | - | - | | 0Ah |
| (0Ah) | - | - | | 0Bh |
| (0Bh) | - | - | | 0Ch |
| (FEh) | - | - | | FFh |
| (FFh) | - | - | | - |

FIG.8

A-DISC

PART-DESCRIPTOR-POINTER TABLE
(PART-DESCRIPTOR POINTER)

| | | |
|---|---|---|
| P-DFA: - | P-EMPTY: 05h | P-FRA: 04h |
| P-TNO1: 01h | P-TNO2: 02h | P-TNO3: 03h |
| P-TNO4: - | P-TNO5: - | P-TNO6: - |
| P-TNO7: - | P-TNO8: - | P-TNO9: - |
| P-TNO253: - | P-TNO254: - | P-TNO255: - |

PART-DESCRIPTOR TABLE
(255 PART DESCRIPTORS)

| | START ADDRESS | END ADDRESS | TRACK MODE | LINK INFORMATION |
|---|---|---|---|---|
| (01h) | 000 | 099 | | — |
| (02h) | 100 | 199 | | — |
| (03h) | 200 | 349 | | — |
| (04h) | 350 | 399 | | — |
| (05h) | — | — | | 06h |
| (06h) | — | — | | 07h |
| (07h) | — | — | | 08h |
| (08h) | — | — | | 09h |
| (09h) | — | — | | 0Ah |
| (0Ah) | — | — | | 0Bh |
| (0Bh) | — | — | | 0Ch |
| (FEh) | — | — | | FFh |
| (FFh) | — | — | | — |

FIG.9

B-DISC

PART-DESCRIPTOR-POINTER TABLE
(PART-DESCRIPTOR POINTER)

| | | |
|---|---|---|
| P-DFA: - | P-EMPTY:05h | P-FRA:01h |
| P-TNO1:02h | P-TNO2:03h | P-TNO3:04h |
| P-TNO4: - | P-TNO5: - | P-TNO6: - |
| P-TNO7: - | P-TNO8: - | P-TNO9: - |
| P-TNO253: - | P-TNO254: - | P-TNO255: - |

PART-DESCRIPTOR TABLE
(255 PART DESCRIPTORS)

| | START ADDRESS | END ADDRESS | TRACK MODE | LINK INFORMATION |
|---|---|---|---|---|
| (01h) | 000 | 049 | | - |
| (02h) | 050 | 124 | | - |
| (03h) | 125 | 274 | | - |
| (04h) | 275 | 399 | | - |
| (05h) | - | - | | 06h |
| (06h) | - | - | | 07h |
| (07h) | - | - | | 08h |
| (08h) | - | - | | 09h |
| (09h) | - | - | | 0Ah |
| (0Ah) | - | - | | 0Bh |
| (0Bh) | - | - | | 0Ch |
| (FEh) | - | - | | FFh |
| (FFh) | - | - | | - |

RECORDING APPARATUS AND RECORDING METHOD

BACKGROUND OF THE INVENTION

1. Field of the Invention

The present invention relates to a recording apparatus capable of recording data to be spread continuously over a plurality recording mediums even if any one of the recording mediums is replaced by another during a recording operation and a recording method adopted in the recording apparatus.

2. Description of the Related Art

In recent years, a system capable of recording and playing back audio data of typically a program has been becoming popular. Examples of such a system are a DAT (Digital Audio Tape) system and an MD (Mini Disc: a trademark) in addition to a tape cassette recorder.

A recording medium used in such a recording/playback system is the so-called removable media which can be replaced by another. Thus, in an operation to record a broadcast program called an air check with a length exceeding a recording area of the recording medium, the user can replace the recording medium with another. To put it in detail, when the recording area of a recording medium currently mounted on the recording/playback apparatus is all used up, the user can suspend the recording operation, eject the recording medium from the apparatus, newly mount a next recording medium and resume the recording operation.

While a recording medium is being replaced with another, however, no data can be recorded on a recording medium so that information supposed to be recorded during a period of time a recording medium is being replaced with another is lost. As a result, information actually recorded on the recording mediums is not continuous. In addition, in an operation to play back data from a plurality of recording mediums into which the data has been recorded in a way described above, information lost during a replacement of a recording medium with another in the recording operation can not of course be played back.

From the user's point of view, it is desirable to prevent continuity of recorded information from being lost as much as possible.

For example, there are some tape cassette recorders and MD systems which are designed into the so-called double-deck system, that is, a recording/playback apparatus having two mechanical-deck units. In the case of such a double-deck recording/playback apparatus, the user is capable of carrying out a recording operation wherein the apparatus is switched to a recording medium mounted on the second mechanical-deck unit at the end of a recording medium mounted on the first mechanical-deck unit. In such a case, however, information is normally lost during a period of time to switch the recording operation from one of the mechanical-deck units to the other.

As a conceivable technique adopted in such a double-deck recording/playback apparatus to prevent recorded information from being lost even in a situation described above, there is an operation to automatically start a recording operation on a recording medium mounted on the second mechanical-deck unit at the end of a recording medium mounted on the first mechanical-deck unit, beginning at a position in the recorded data at which the recording operation on the first mechanical-deck unit reaches the end of the recording medium mounted thereon. By adopting this technique, the end of data recorded on the recording medium mounted on the first mechanical-deck unit is continued by the beginning of data recorded on the recording medium mounted on the second mechanical-deck unit. As a result, recorded information with no lost part can be obtained.

Nevertheless, we know that it is extremely difficult to control particularly synchronization of data processing timing with switching of transfer of recorded data from a mechanical-deck unit to another in order to make recorded data spread over a plurality of recording mediums continuous in a strict sense. This is because a location in a data sequence at which a recording operation is switched from a mechanical-deck unit to another is unknown. In addition, in order to play back recorded audio data spread over a plurality of recording mediums continuously without for example a data intermission, it is necessary to provide a somewhat complicated playback-signal processing function to join the last data played back from an immediately preceding disc to the first data played back from the following disc to form a sequence.

SUMMARY OF THE INVENTION

It is thus an object of the present invention addressing the problems described above to provide a capability of recording data over a plurality of recording mediums without losing any information to be recorded during a recording period and a capability of playing back data from a plurality of recording mediums without losing any information to be played back in a playback operation.

In addition, it is another object of the present invention to provide a recording/playback apparatus to implement such capabilities with as much a simple configuration of control processing as possible.

According to one aspect of the present invention, there is provided a recording apparatus for preserving recorded data continuously on a plurality of recording mediums in a recording operation even in the event of switching the recording operation from any one of the recording mediums to another which apparatus comprises:

- at least two recording means, namely, a first recording means and a second recording means;
- a data switching means for supplying recorded data selectively to the recording means; and
- a wait-state terminating means for detecting a location in close proximity to an end point of a recordable area of a first recording medium mounted on the first recording means currently being subjected to an early recording operation and for starting a later recording operation of the second recording means having been waiting for the later recording operation to be started before an arrival of the early recording operation of the first recording means at the end point of the recordable area of the first recording medium.

According to another aspect of the present invention, there is provided a recording method for preserving recorded data continuously on a plurality of recording mediums in a recording operation even in the event of switching the recording operation from any one of the recording mediums to another which method comprises:

- a step of detecting a location in close proximity to an end point of a recordable area of a first recording medium mounted on a first recording means currently being subjected to an early recording operation; and
- a step of starting a later recording operation of a second recording means having been waiting for the later recording operation to be started before an arrival of the early recording operation of the first recording means at the end point of the recordable area of the first recording medium.

BRIEF DESCRIPTION OF THE DRAWINGS

FIG. 2 is an explanatory diagram used for describing U-TOC sector 0 of a mini-disc system;

FIG. 5A is an explanatory diagram used for describing a part-descriptor-pointer table in a U-TOC in a recording state shown in FIG. 4;

FIG. 5B is an explanatory diagram used for describing a part-descriptor table of the U-TOC in the recording state shown in FIG. 4;

FIG. 8 is an explanatory diagram used for describing details of a U-TOC for the A-disc completing the seamless recording operation shown in FIGS. 7A and 7B;

FIG. 9 is an explanatory diagram used for describing details of a U-TOC for the B-disc completing the seamless recording operation shown in FIGS. 7A and 7B;

DESCRIPTION OF THE PREFERRED EMBODIMENTS

The present invention will become more apparent from the following detailed description of some preferred embodiments with reference to FIGS. 1 to 13. The embodiments each implement a recording/playback apparatus for recording and playing back data into and from a mini disc, a kind of optical magnetic disc used as a recording medium. The recording/playback apparatuses implemented by the embodiments are each double-deck-type apparatus provided with two mechanical-deck units each having a mechanism capable of recording and playing back data into and from an optical magnetic disc.

The present invention is explained in the following order.

Figure 1A:
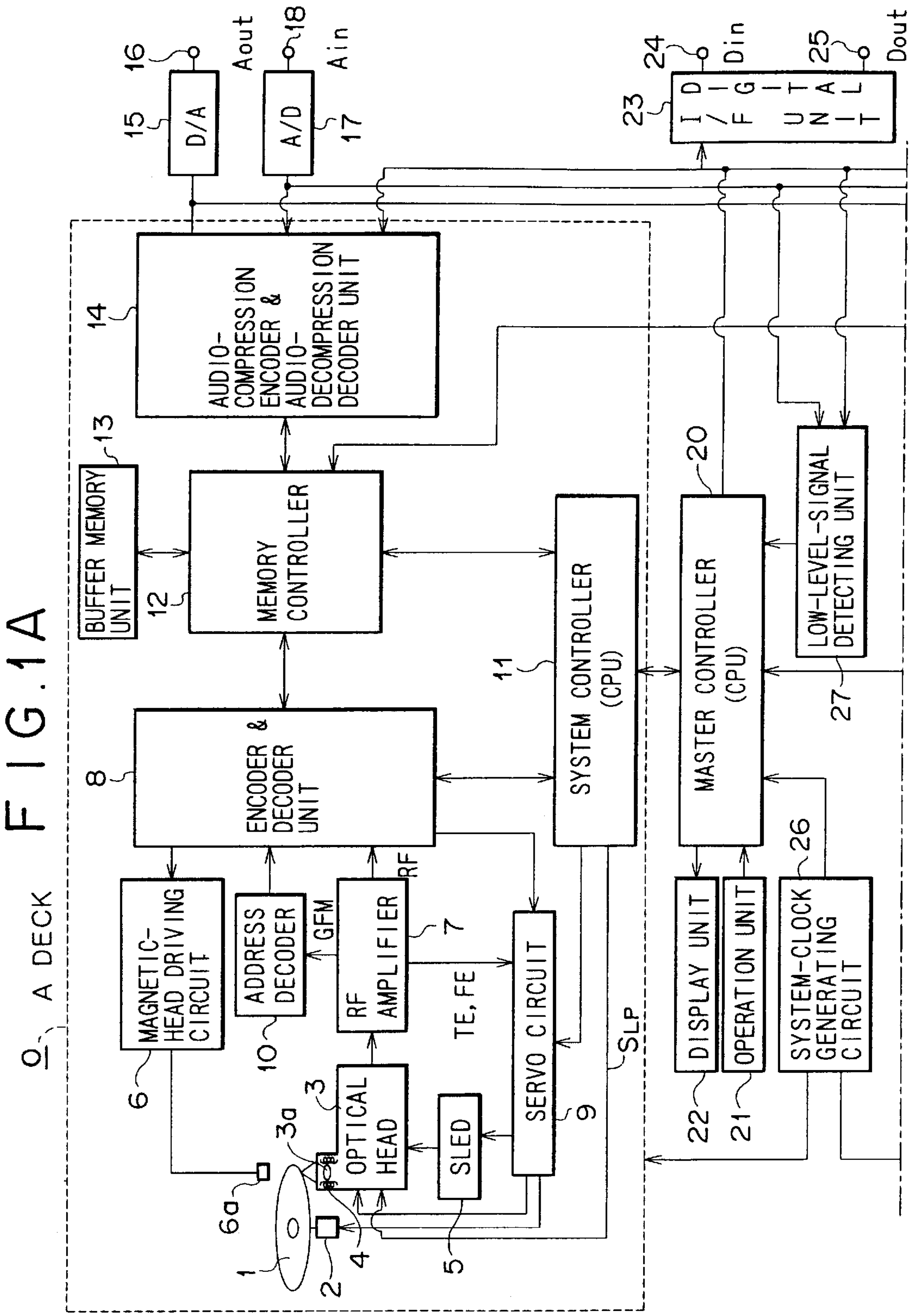
FIGS. 1, 1A and 1B are block diagrams showing a recording/playback apparatus functioning as an edit apparatus implemented by an embodiment of the present invention.
Figure 1:
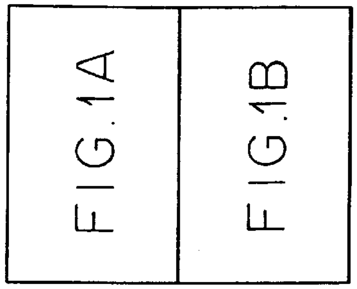
Figure 1B:
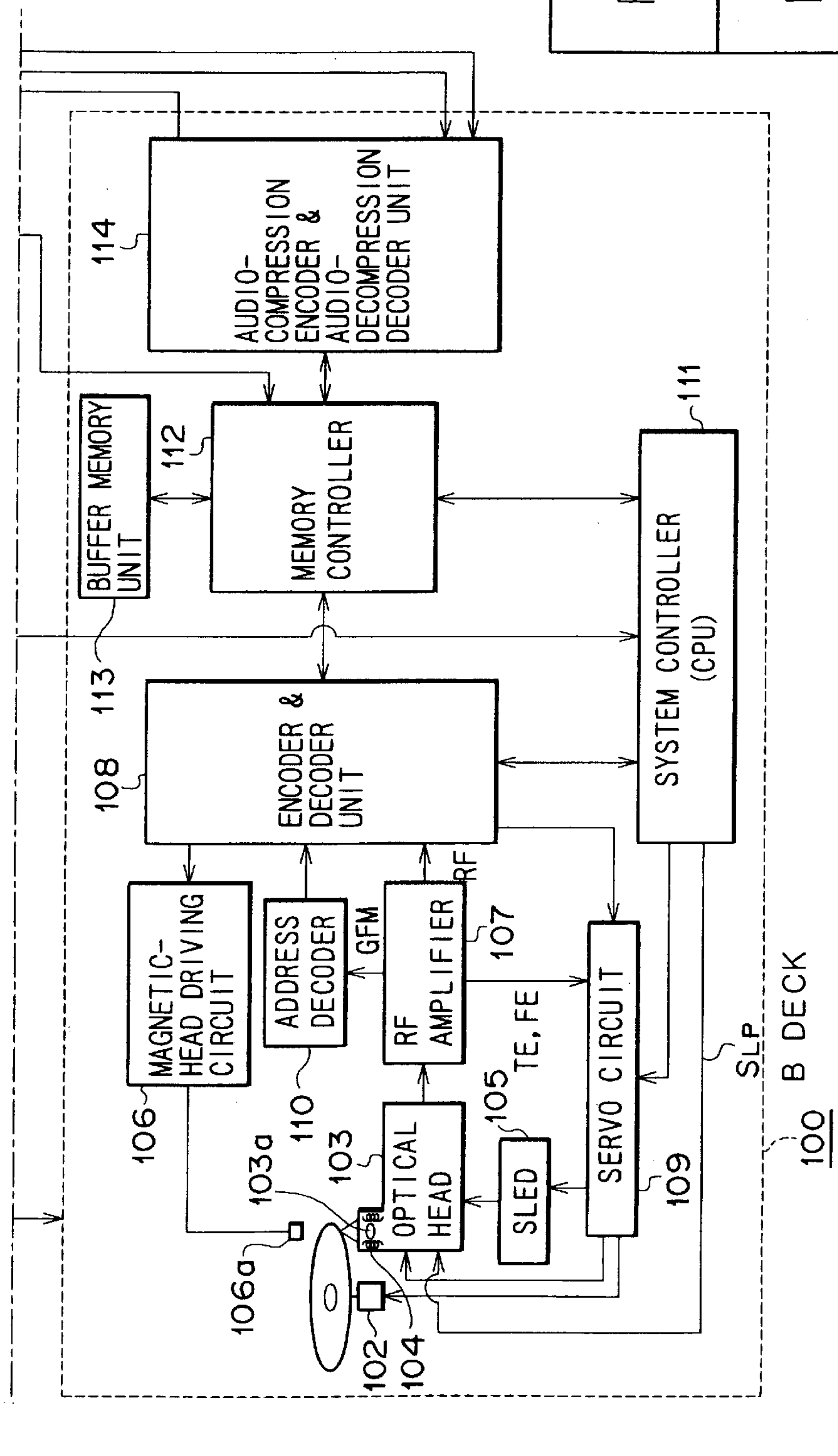

1. Configuration of a First Embodiment Implementing a Recording/Playback Apparatus
2. U-TOC (User-Table of Contents) Sectors
3. Typical Recording State on a Disc
4. Seamless Recording Operation
5. Processing of the Seamless Recording Operation
6. Processing of the Seamless Playback Operation
7. Second Embodiment
8. Third Embodiment 1. Configuration of a First Embodiment Implementing a Recording/Playback Apparatus FIGS. 1, 1A and 1B are block diagrams showing a recording/playback apparatus implemented by a first embodiment of the present invention.

As shown in the figure, the recording/playback apparatus has two mechanical-disc units, namely, an A deck unit 0 and a B deck unit 100 each used for recording and playing back data into and from a mini disc mounted thereon. The A deck unit 0 is explained first.

In the A deck unit 0, an optical magnetic disc 1 having audio data recorded thereon is driven into rotation by a spindle motor 2. It should be noted that an optical magnetic disc 1 is also referred to hereafter simply as a disc. In recording and playback operations, a laser beam is radiated by an optical head 3 to the disc 1. It is worth noting that, for the sake of convenience, the disc 1 mounted on the A deck unit 0 is also called an A disc hereafter.

In a recording operation, the optical head 3 outputs a laser beam at a high level for heating a recording track to the Curie temperature. In a playback operation, on the other hand, the optical head 3 outputs a laser beam at a relatively low level and data is then detected from the laser beam which is reflected by a magnetic Kerr effect.

Thus, an optical system serving as a laser generating means and a detector for detecting a reflected beam are mounted on the optical head 3. The optical system includes a polarization beam splitter and an objective lens 3*a*. The objective lens 3*a* is supported by a 2-shaft mechanism 4 so that the lens 3*a* can be moved in the radial direction of the disc 1 and in a direction to approach or move away from the disc 1.

A magnetic head 6*a* is installed on the opposite side with respect to the disc 1 at a location corresponding to the optical head 3. In a recording operation, the magnetic head 6*a* applies a magnetic field modulated by data to be recorded to the disc 1.

The entire optical head 3 and the magnetic head 6*a* can be moved by a sled mechanism 5 in the radial direction of the disc 1.

In a playback operation, information detected by the optical head 3 from the disc 1 is supplied to an RF (Radio Frequency) amplifier 7. The RF amplifier 7 processes the information supplied thereto to extract a playback RF signal, a tracking-error signal TE, a focus-error signal FE and groove information GFM which is absolute-location information recorded in the form of a pregroove formed on the disc 1 as a wobbling groove.

The extracted playback RF signal is supplied to an encoder & decoder unit 8 whereas the tracking-error signal TE and the focus-error signal FE are fed to a servo circuit 9. The groove information GFM is supplied to an address decoder 10.

The servo circuit 9 generates a variety of servo driving signals based on data including the tracking-error signal TE, the focus-error signal FE, a track-jump command, an access command and detected information representing a rotational speed of the spindle motor 2. The track-jump command and the access command are issued by a system controller 11 which is implemented by typically a microcomputer. The servo driving signals are used to drive the 2-shaft mechanism 4 and the sled mechanism 5 to execute focus and tracking control and to control the spindle motor 2 to rotate at a Constant Linear Velocity (CLV).

The address decoder 10 decodes the groove information GFM supplied thereto to generate addresses which are supplied to the system controller 11 for use in a variety of control operations.

In the encoder & decoder unit 8, the playback RF signal is subjected to a decoding process such as EFM (Eight-to-Fourteen Modulation) and CIRC (Cross Interleave Reed Solomon Code) decoding to extract addresses and subcodes included in the playback RF signal as data. The extracted data is supplied to the system controller 11.

Sector data, that is, audio data, completing the decoding process such as the EFM modulation and the CIRC in the encoder & decoder unit 8 as described above is written by a memory controller 12 into a buffer memory unit 13 to be stored therein temporarily. Playback data is fetched by the optical head 3 from the disc 1 and then transferred through a system from the optical head 3 to the buffer memory unit 13 at a speed of 1.41 Mbit/second. In general, the operations to fetch and transfer the data are carried out intermittently.

The playback data stored in the buffer memory unit 13 is read out with proper timing so as to supply the data to an audio-compression encoder & audio-decompression decoder unit 14 at a transfer rate of 0.3 Mbit/second. The data read out from the buffer memory unit 13 is then subjected to playback-signal processing such as audio decompression, which is a kind of decoding, before being supplied to a digital interface unit 23 and a D/A converter (Digital/Analog Converter) 15 as audio data. It should be noted that the audio decompression is carried out as inverse processing of audio compression done in a recording operation to be described later.

In this case, the audio data supplied by the audio-compression encoder & audio-decompression decoder unit 14 to the digital interface unit 23 is output to typically external equipment by way of a digital output terminal 25. On the other hand, the audio data supplied to the D/A converter 15 is output as analog audio signals to typically left and right channels of stereo equipment by way of an audio output terminal 16. The analog audio signals output by the D/A converter 15 can also conceivably be output to other equipment such as speakers or headphone terminals. It should be noted that none of the external equipment, the stereo equipment and other equipment is shown in the figure.

In some applications, a data transfer line can be provided between a buffer memory unit 13 of the A deck unit 0 and a buffer memory unit 113 of the B deck unit 100 so that audio data can be transferred between the A deck unit 0 and the B deck unit 100.

In an operation to record data into the disc 1, audio data representing a digital signal is input from a digital input terminal 24 by way of the digital interface unit 23, or an analog audio signal is input from an audio input terminal 18 by way of an A/D converter (Analog/Digital Converter) 17 for converting the analog audio signal into audio data.

In this embodiment, the audio data obtained from the digital interface unit 23 or the A/D converter 17 may be originated from an audio signal of a program received by typically an FM (Frequency Modulation) tuner or a satellite-broadcast tuner which is not shown in the figure. When a tuner and the recording/playback apparatus provided by the embodiment are combined into a system, they can be built into a single unit or built separately.

The audio data input as described above is supplied to the audio-compression encoder & audio-decompression decoder unit 14 for carrying out an audio compression encoding process thereon.

Recording data obtained as a result of the audio compression encoding process carried out by the audio-compression encoder & audio-decompression decoder unit 14 is written by the memory controller 12 into the buffer memory unit 13 to be stored therein temporarily. Then, at a point of time the amount of data stored in the buffer memory unit 13 exceeds a predetermined value, the data is read out in predetermined data units and transferred to the encoder & decoder unit 8. In the encoder & decoder unit 8, the recording data is subjected to encoding process such as a CIRC-encoding process and eight-to-fourteen demodulation before being supplied to a magnetic-head driving circuit 6. It should be noted that the eight-to-fourteen demodulation is inverse processing of the EFM carried out in a playback operation described earlier.

The magnetic-head driving circuit 6 supplies a magnetic-head driving signal to a magnetic head 6*a* in accordance with the recording data completing the encoding process and the eight-to-fourteen demodulation. To be more specific, the recording data causes a magnetic field of the N or S pole generated by the magnetic head 6*a* to be applied to the disc 1. In addition, the system controller 11 outputs a control signal to the optical head 3 so as to generate a laser beam at the recording level.

By temporarily storing the recording data in the buffer memory unit 13, the operation to record the audio data input continuously into the disc 1 can be carried out intermittently.

The B deck unit 100 comprises functional circuits ranging from a spindle motor 102 to an audio-compression encoder & audio-decompression decoder unit 114 which have the same configurations as the functional circuits ranging from the spindle motor 2 to the audio compression encoder & audio-decompression decoder unit 14 employed in the A deck unit 0, making it unnecessary to repeat their description.

The analog-signal output system comprising the D/A converter 15 and the audio output terminal 16, the analog-signal input system comprising the audio input terminal 18 and the A/D converter 17 as well as the digital-signal input/output system comprising the digital interface unit 23, the digital input terminal 24 and the digital output terminal 25 are common to the A deck unit 0 and the B deck unit 100.

Also in the case of the B deck unit 100, audio data played back from the B disc is output to the audio output terminal 16 by way of the D/A converter 15 or the digital output terminal 25 by way of the digital interface unit 23.

On the other hand, audio data to be recorded into the B disc is also input from the audio input terminal 18 by way of the A/D converter 17 or the digital input terminal 24 by way of the digital interface unit 23.

Implemented by typically a microcomputer, a master controller 20 is a system controller for controlling the operations of the A deck 0 and the B deck 100 in a coordinated manner. On the other hand, system controllers 11 and 111 function as circuit members for controlling mainly the operations of the A deck unit 0 and the B deck unit 100 respectively.

By connecting the master controller 20 to the digital interface unit 23, the master controller 20 is capable of typically extracting sub-codes inserted into digital audio data and executing necessary control processing.

An operation unit 21 and a display unit 22 are connected to the master controller 20.

The operation unit 21 has a variety of keys to be operated by the user. The keys of the operation unit 21 include a recording key, a playback key, a halt key, an AMS (Auto Music Sense) key, a fast-feed key and a rewind key. Information which is generated when a key is operated is supplied to the master controller 20.

The recording/playback apparatus has edit modes in which data recorded on the A or B disc mounted on the A deck unit 0 or the B deck unit 100 respectively can be edited separately. The edit modes include a divide mode for dividing a track, a move mode for changing a track number on a disc and a combine mode for linking tracks. The user is also allowed to carry out an operation to select one of the edit modes.

As will be described later, in this embodiment, the so-called seamless recording and playback operations of the A deck unit 0 and the B deck unit 100 are controlled in a coordinated manner so that data can be recorded by being spread over a plurality of discs or data spread over a plurality of discs can be played back without missing any information. If necessary, the operation unit 21 is provided with a key for setting a seamless recording mode for carrying out a seamless recording operation and a key for setting a seamless playback mode for carrying out a seamless playback operation.

Implemented by typically a liquid-crystal display device, the display unit 22 is controlled by the master controller 20 to display information such as the operating status of the A deck unit 0 and the B deck unit 100, a track number and a time.

A system-clock generating circuit 26 includes components such as a liquid-crystal oscillator for generating a signal having a stable required frequency. The signal is supplied to the A deck unit 0 and the B deck unit 100 as a system-clock signal serving as a reference of signal processing timing.

The recording/playback apparatus implemented by this embodiment has a low-level-signal detecting unit 27. The low-level-signal detecting unit 27 receives digital audio data supplied to the recording/playback apparatus by way of the A/D converter 17 or the digital interface unit 23.

When the digital audio data supplied to the recording/playback apparatus is a low-level signal which has a level not higher than a predetermined value continuously for at least a predetermined period of time, the low-level-signal detecting unit 27 outputs a detection signal indicating a low-level-signal state. Since a low-level signal is generally generated at a gap between tracks, the detection signal indicating a low-level-signal state can be regarded typically as a signal indicating a track delimiter. In this embodiment, the detection signal is supplied to the master controller 20.

In an operation to record or play back data onto or from the disc 1 in the A deck unit 0 or the B deck unit 100, it is necessary to read out control information, that is, a pre-mastered TOC (P-TOC) and a user TOC (U-TOC), from the disc 1.

Let the operation be exemplified by the A deck unit 0. By referring to these pieces of control information, the system controller 11 is capable of recognizing the address of an area on the disc 1 which data is to be recorded into or played back from. Since the control information is also stored in the buffer memory unit 13, the buffer memory unit 13 needs to be divided into a buffer area for storing data to be recorded and reproduced data, and an area for storing the control information.

When the disc 1 is mounted on the A deck unit 0, the system controller 11 reads out these pieces of control information by carrying out an operation to play back data from an innermost circumference of the disc 1 for recording the control information and stores the information into the buffer memory unit 13. Thereafter, in an operation to record or play back data into or from the disc 1, the control information is referred to.

The U-TOC is edited or rewritten when data is recorded into or deleted from the disc 1. In actuality, the system controller 11 edits and rewrites the U-TOC information stored in the buffer memory unit 13 each time data is recorded into or deleted from the disc 1. The edited and rewritten U-TOC information is then transferred from the buffer memory unit 13 to the U-TOC area on the disc 1 with predetermined timing.

By the same token, the system controller 111 stores control information recorded on the B disc mounted on the B deck unit 100 into the buffer memory unit 113 and carries out similar operations to those described above.

In the so-called double-deck system with a configuration described above, the recording/playback apparatus implemented by the embodiment can be provided with a dubbing function for example.

To be more specific, while an operation to play back data from a disc 1 mounted on one of the deck units is being carried out, an operation to record the data onto a disc 1 mounted on the other deck unit is performed. In this way, data recorded on one of the discs 1 can be recorded onto the other disc 1.

To put it in detail, in an operation to dub audio data recorded on the A disc to the B disc, for example, the audio data read out from the A disc and decoded by the encoder & decoder unit 8 is typically transferred from the buffer memory unit 13 to the buffer memory unit 113 employed in the B deck unit 100 to be stored therein.

In a mini-disc system, a data unit known as a cluster is used as a minimum unit in a recording operation. A cluster comprises a 32-sector main-data area and a 4-sector linking area.

Typically, when audio data of 1 cluster is stored in the buffer memory unit 113, the data is read out in sector units and supplied to the encoder & decoder unit 108 to be converted into an EFM signal in an encoding process carried out thereby. Then, the magnetic-head driving circuit 106 supplies a magnetic-head driving signal to the magnetic head **106*a* in accordance with the in EFM signal completing the encoding process as described above. To be more specific, the EFM signal causes a magnetic field of the N or S pole generated by the magnetic head 106*a* to be applied to the B disc. In this way, the recording/playback apparatus carries out a dubbing operation to record audio data recorded on the A disc into the B disc. It is also possible to reversely dub audio data recorded on the B disc to the A disc in conformity with the operation described above. In either case, the master controller 20 controls a coordinated operation of the A deck unit 0 and the B deck unit 100**.

Also in such a dubbing operation, data stored in the buffer memory unit 13 or 113, that is, audio data read out from the A or B disc, can be supplied to the audio-compression encoder & audio-decompression decoder unit 14 or 114 respectively. Thus, the reproduced audio data can be output to the output terminal 25 by way of the digital interface unit 23.

A dubbing operation can be carried out at a normal or high dubbing speed. In a dubbing operation at a normal speed, the playback deck unit reads out data from a disc at the same speed as a normal playback operation. In the recording deck unit, data is recorded into a disc typically in cluster units in accordance with the amount of data accumulated in the buffer memory unit employed in the recording deck unit. At that time, audio data output by the playback deck unit can be monitored by reading out the data from the buffer memory unit 13 or 113 and the audio data can be output as is the case with a normal playback operation.

In a dubbing operation carried out at a high speed, on the other hand, data is read out from a disc mounted on the playback deck unit and stored in the buffer memory unit 13 or 113 thereof at a transfer rate higher than that of a normal playback operation. Much like the normal-speed dubbing operation, in the recording deck unit, data is recorded into a disc typically in cluster units in accordance with the amount of data accumulated in the buffer memory unit 13 or 113 employed in the recording deck unit. Since data is transferred from the disc to the buffer memory unit 13 or 113 in the playback deck unit at a higher transfer rate, however, the data is actually recorded into the disc mounted on the recording deck unit also at a rate higher than that of the normal recording operation. In this embodiment, a dubbing operation, that is, an operation to transfer data from one disc to another, is carried out at a predetermined high speed unless otherwise specified by an operation carried out by the user. This is because, by carrying out an operation to transfer data from one disc to another at a high speed, the efficiency of editing work can be improved.

By providing a plurality of deck units, in the so-called air check to record a program of a digital satellite broadcast or an FM broadcast, for example, it is possible to continuously record a program longer than what can be recorded onto 1 disc.

In general, a program is first recorded onto typically the A disc mounted on the A deck unit 0 and, when the recordable area on the A disc is all used up, the recording operation is continued to the B disc mounted on the B deck unit 100, that is, an operation to record a program onto the B disc is started.

By carried out a seamless recording operation in this embodiment as described above, it is possible to at least retain information between data recorded onto one disc and data recorded onto another disc or to prevent information of the air check from being lost. It is also possible to carry out a seamless playback operation to reproduce data from a plurality of discs used for recording the data in a seamless recording operation. The seamless playback operation will be described later.

2. U-TOC Sectors

As described above, in an operation to record or play back data into or from a disc 1, the system controller 11 reads out a P-TOC (pre-mastered TOC) and a U-TOC (user TOC) which are recorded on the disc 1 as control information.

This paragraph explains U-TOC sectors which are used for recording control information for operations to record and play back data onto and from tracks on the disc 1.

In a mini-disc system, a U-TOC and a P-TOC are provided as TOC information. The P-TOC is recorded in a pit area on the innermost circumference of the disc 1. The P-TOC is read-only information used for, among other purposes, controlling locations of a recordable user area, a lead-out area and a U-TOC area on the disc 1. Note that, in the mini-disc system, it is also possible to use a playback-only disc on which all data is recorded in a pit form. In the case of a playback-only disc, programs stored in a ROM in advance can also be controlled by using a P-TOC. In this case, the U-TOC is not required.

Details of the P-TOC are not explained. The U-TOC provided on a recordable disc 1 is described as follows.

FIG. 2 is a diagram showing the format of U-TOC sector 0.

Sectors 0 to 4 are each defined as a U-TOC sector. Sectors 1 and 4 are areas used for storing character information whereas sector 2 is an area used for storing a recording date and a recording time. The following description explains only U-TOC sector 0 which is always required in operations to record and play back data onto and from the disc 1.

U-TOC sector 0 is a data area used for recording control information of areas containing programs recorded by the user and free areas to be used by the user for recording new programs.

In an operation to record a program onto the disc 1, for example, the system controller 11 searches U-TOC sector 0 for information on a free area on the disc 1 before recording the program into the area. In an operation to play back a program from the disc 1, on the other hand, U-TOC sector 0 is searched for information on an area for recording the program before accessing the area and playing back the program.

U-TOC sector 0 is a data area with a size of 2,352 bytes (=4×588 bytes) shown in FIG. 2. At the beginning of the sector, a synchronization pattern is stored. The synchronization pattern is a series of data bytes of all 0 or 1.

The synchronization pattern is followed by three address bytes, namely, "Cluster H", "Cluster L" and "Sector". "Cluster H" and "Cluster L" are a cluster address while "Sector" is a sector address. The sector address is followed by a "Mode" byte for storing mode information. The synchronization pattern and the following 4 bytes form a header.

A sector is thus a data unit with a size of 2,352 bytes as described above. 36 sectors constitute a cluster. The synchronization pattern and the addresses are recorded not only for U-TOC sector 0 but also for each P-TOC sector and each data sector in which an actual program is recorded.

As described above, a cluster address comprises two bytes, namely, a high-order byte "Cluster H" and a low-order byte "Cluster L", whereas a sector address is 1 "Sector" byte.

Recorded at predetermined byte locations following the "Mode" byte is data including a maker code, a model code, a first-track number "First TNO", a last-track number "Last TNO", sector utilization status "Used sectors", a disc serial number and a disc ID (identification).

Areas of tracks used for storing data recorded by the user, free areas and other areas on the disc are controlled by using part descriptors described in a part-descriptor table at the end of U-TOC sector 0 described below. Preceding the part-descriptor table, an area for recording a variety of part-descriptor pointers pointing to the part descriptors is provided in U-TOC sector 0 as a part-descriptor-pointer table. The part-descriptor pointers are a P-DFA (a pointer for a defective area), a P-EMPTY (a pointer for an empty slot), a P-FRA (a pointer for a freely recordable area) and a P-TNO01 to a P-TNO255 (pointers for track numbers).

A total of 255 part descriptors, namely, part descriptors 01h to FFh, are provided in U-TOC sector 0 as the part-descriptor table following the part-descriptor-pointer table. The part descriptors are pointed to by the part-descriptor pointers P-FDA to P-TNO255. Each of the part descriptors is used for recording a start address serving as an origin of a part, an end address serving as a terminal of the part and mode information showing a track mode of the part. A part means a physically contiguous portion of a track for recording data which is continuous along the time axis. A part described in a particular part descriptor in U-TOC sector 0 may be continued by another part described in another part descriptor by linking the particular part descriptor to the other part descriptor. For this reason, the particular part descriptor also includes link information showing the other part descriptor which describes the start and end addresses of the other continuation part.

It should be noted that the symbol "h" added to a number as a suffix in this specification indicates that the number is expressed in the hexadecimal format.

In a recording/playback apparatus of this type, in spite of the fact that data may be recorded into areas which are not physically contiguous, that is, recorded by spreading the data over a plurality of parts, there will be no problem in a playback operation if the data is played back by accessing the parts sequentially. A user program is recorded by spreading the program over a plurality of parts for, among other purposes, improving the efficiency of utilization of recordable areas on the disc.

Link information provided in the mini-disc system is the number of a part descriptor in the range 01h to FFh. Link information included in a specific part descriptor thus specifies the number of another part descriptor describing another part to which a part described in the specific part descriptor is to be continued.

A part descriptor in the part-descriptor table in U-TOC sector 0 thus represents a part. In the case of a program comprising 3 linked parts, for example, the locations of the 3 parts are controlled by 3 part descriptors which are linked to each other by pieces of link information included in the part descriptors.

In actuality, link information is a number used in predetermined processing to find a byte position in U-TOC sector 0. Link information thus points to a part descriptor at a byte position represented by (304+number×8) where the number is the link information.

The type of data recorded in a part represented by any of part descriptors 01h to FFh in the part-descriptor table of U-TOC sector 0 is specified by any of the part-descriptor pointers P-DFA, P-EMPTY, P-FRA and P-TN01 to P-TNO255 of the part-descriptor-pointer table.

The part-descriptor pointer P-DFA is taken as an example. The part-descriptor pointer P-DFA specifies a defective area caused by typically a flaw on the disc 1 by pointing to a single part descriptor describing the start and end addresses of the defective area, or a part descriptor at the head of a plurality of part descriptors which describe the start and end addresses of the same plurality of defective areas. That is to say, the start and end addresses of a defective area existing on a disc are cataloged in a specific part descriptor selected among the part descriptors 01h to FFh, and the specific part descriptor is pointed to by the part-descriptor pointer P-DFA. If another defective area exists on the disc, the start and end addresses of the other defective area are cataloged in another part descriptor linked to the specific part descriptor by the link information included in the specific part descriptor. If there is no more defective area, the link information included in the other part descriptor is set at typically 00h to indicate this other part descriptor is the last one indicating a defective area.

The part-descriptor pointer P-EMPTY specifies an unused part descriptor or a part descriptor at the head of a plurality of unused part descriptors in the part-descriptor table. That is to say, the part-descriptor pointer P-EMPTY is set at a value in the range 01h to FFh indicating the unused part descriptor. If a plurality of unused part descriptors exist in the part-descriptor table, the part-descriptor pointer P-EMPTY is set at a value in the range 01h to FFh indicating a part descriptor at the head of the unused part descriptors. The remaining part descriptors are linked to the head part descriptor by using pieces of link information included in the part descriptors to form a linked list with the head part descriptor placed at the beginning of the list. In this way, unused part descriptors in the part-descriptor table are controlled.

The part-descriptor pointer P-FRA specifies a free area on the disc 1 into which data can be written by pointing to a single part descriptor describing the start and end addresses of the free area, or a part descriptor at the head of a plurality of part descriptors which describe the start and end addresses of the same plurality of free areas. A free area also implies an area from which data has been erased. That is to say, the start and end addresses of a free area existing on a disc are cataloged in a specific part descriptor selected among the part descriptors 01h to FFh, and the single part descriptor is pointed to by the part-descriptor pointer P-FRA. If another part serving as a free area exists on the disc, the start and end addresses of the other free area are cataloged in another part descriptor linked to the specific part descriptor by the link information included in the specific part descriptor. In this way, the start and end addresses of free areas are cataloged in part descriptors which are linked to the specific part descriptor by using pieces of link information included in the part descriptors to form a link list with the specific part descriptor put at the head of the list. A part descriptor at the end of the list contains link information set at typically 00h to indicate this part descriptor is the last one describing a free area.

Figure 3:
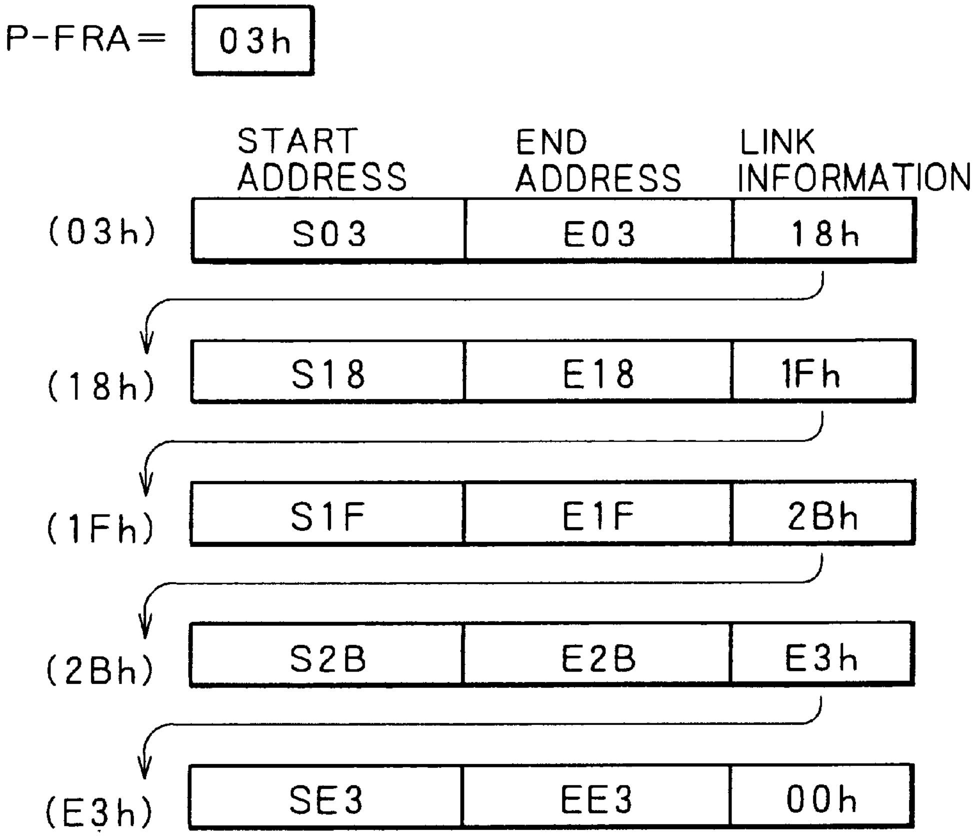
FIG. 3 is an explanatory diagram used for describing a linking technique adopted in U-TOC sector 0 of a mini-disc system.

FIG. 3 is a diagram showing a model of a link list comprising part descriptors used for controlling free areas. Assume that a part with a start address of S03h and an end address of E03h, a part with a start address of S18h and an end address of E18h, a part with a start address of S1Fh and an end address of E1Fh, a part with a start address of S2Bh and an end address of E2Bh and a part with a start address of SE3h and an end address of EE3h are each a free area. In this case, let the part from S03h to E03h, the part from S18h to E18h, the part from S1Fh to E1Fh, the part from S2Bh to E2Bh and the part from SE3h to EE3h be described by part descriptors 03h, 18h, 1Fh, 2Bh and E3h respectively. In this case, the part descriptors 03h, 18h, 1Fh, 2Bh and E3h are linked by pieces of link information 18h, 1Fh, 2Bh and E3h included in the part descriptors 03h, 18h, 1Fh and 2Bh respectively to form a link list with the part descriptor 03h at the head of the list pointed to by the free-area part-descriptor pointer P-FRA in the part-descriptor-pointer table and the link information of the part descriptor E3h at the end of the list set at 00h. It should be noted that part descriptors for controlling defective areas in the part-descriptor table form a link list similar to the one shown in FIG. 3. By the same token, unused part descriptors also form a link list similar to the one shown in FIG. 3.

In the case of an optical magnetic disc with no program data recorded thereon and no defective area at all, the free-area part-descriptor pointer P-FRA is set to point to the part descriptor 01h to indicate that the recordable user area on the disc is all a free area. Since the remaining part descriptors 02h to FFh are not used, the unused-area part-descriptor pointer P-EMPTY is set to point to the part descriptor 02h and the other part descriptors 03h to FFh are linked to the part descriptor 02h by using pieces of link information included in the part descriptors 02h to FEh to form a linked list with the part descriptor 02h placed at the beginning of the list. To be more specific, the link information included in the part descriptor 02h is set at 03h to point to the part descriptor 03h, the link information included in the part descriptor 03h is set at 03h to point to the part descriptor 04h and so on. Finally, the link information included in the part descriptor FEh is set at FFh to point to the part descriptor FFh. The link information included in the part descriptor FFh is set at 00h to indicate that there are no more unused part descriptors in the part-descriptor table.

The start address of the recordable user area and an address immediately preceding the start address of the lead-out area are cataloged as a start address and an end address respectively in the part descriptor 01h.

The part-descriptor pointers P-TNO1 to P-TNO255 specify tracks on the disc 1 on which data such as a user program is recorded by pointing to part descriptors. To be more specific, for example, the part-descriptor pointer P-TNO1 specifies data of the first track by pointing to a part descriptor describing a single part or the earliest part of a plurality of parts for recording the data of the first track.

To put it in detail, assume that a first-track program is recorded continuously in a single part for example. In this case, the start and end addresses of the recording area on the first track are cataloged in a part descriptor pointed to by the part-descriptor pointer P-TNO1 as start and end addresses respectively.

As another example, assume that a first-track program is recorded in a plurality of discrete parts which are described by part descriptors arranged sequentially to represent locations in an order along the time axis in which the program is recorded. To be more specific, the second-track program starts from the earliest part described by a first part descriptor pointed to by the part-descriptor pointer P-TNO2 and continues through subsequent parts along the time axis. The subsequent parts are described by part descriptors linked to the first part descriptor by pieces of link information to form a link list with the first part descriptor placed at the head of the link list which ends with a part descriptor containing link information set at 00h.

By describing all discrete parts for recording data of, for example, a second-track program using part descriptors forming a link list in U-TOC sector 0 as described above, in an operation to record or play back data into or from the area of the second-track program, the optical head 3 and the magnetic head 6 can be driven to access the discrete parts in accordance with information recorded in U-TOC sector 0 so that the recording area can be utilized with a high degree of efficiency in the recording operation or continuous program information can be read out from the discrete parts in the playback operation.

As described above, management of areas on the writable disc 1 is executed by using the P-TOC whereas defective areas, empty areas, free areas and recordable user areas for recording programs are controlled by using the U-TOC.

3. Typical Recording State on a Disc

The area structure of the disc 1 and a typical recording state controlled by using the P-TOC and the U-TOC are described.

Figure 4:
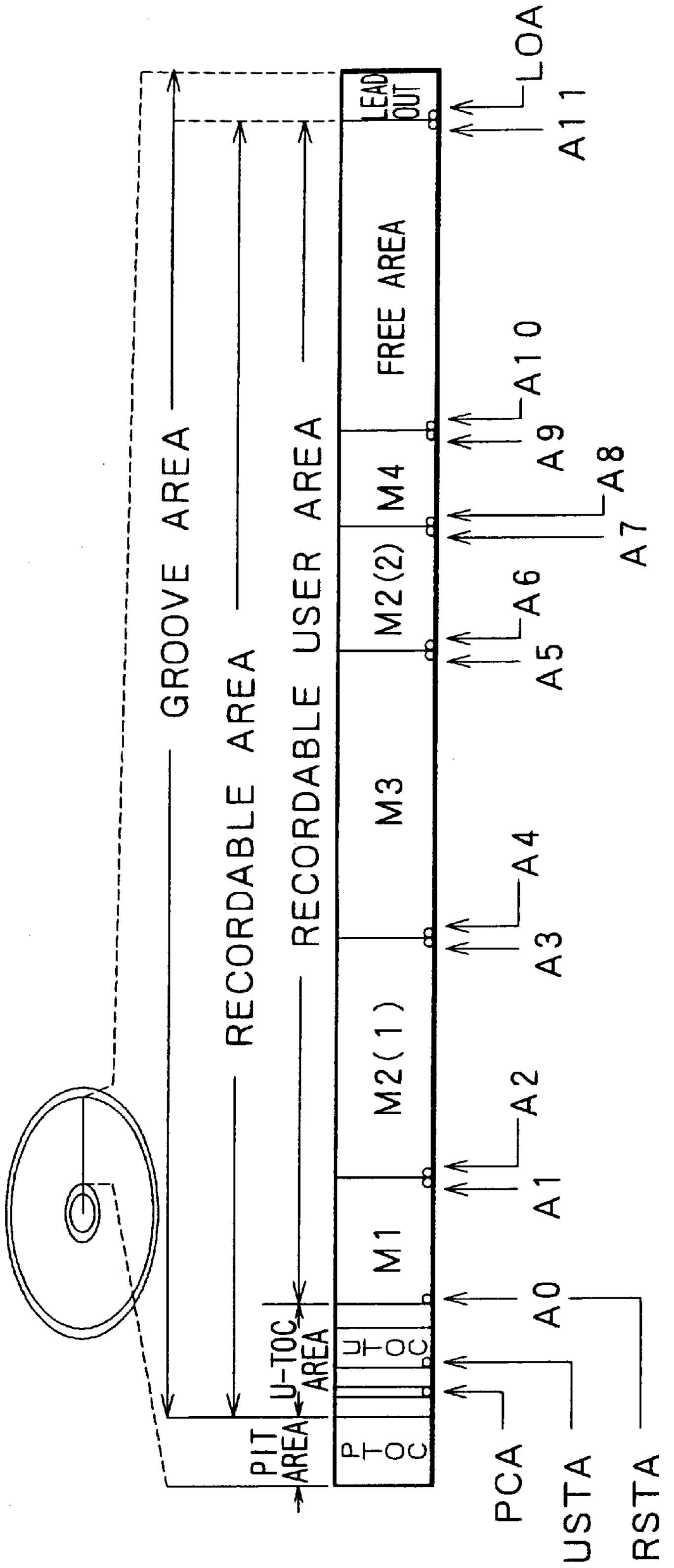
FIG. 4 is an explanatory diagram used for describing a structure and control of recordable areas on a mini disc.

FIG. 4 is an explanatory diagram used for describing a structure of recordable areas on the disc 1 as a model shown in the radial direction of the disc 1. In the case of an optical magnetic disc, the recordable areas are divided into two large regions, namely, a pit area and a groove area shown in FIG. 4. The pit area is an area in which data is recorded by emboss pits and the groove area is an optical magnetic area in which grooves are formed.

In the pit area, the P-TOC is recorded repeatedly. In the P-TOC, the location of the U-TOC is indicated by a U-TOC start address (USTA). In addition, the P-TOC also includes addresses of locations shown in FIG. 4 such as a lead-out start address (LOA), a recordable user area start address (RSTA) and a power calibration area start address (PCA).

The groove area is formed after the pit area on the innermost circumference of the disc 1. A zone in the groove area up to the lead-out start address (LOA) recorded in the P-TOC is a recordable area in which data can be recorded. The rest is a lead-out area.

A zone in the recordable area from the recordable user area start address (RSTA) to a location immediately preceding the lead-out start address (LOA) is a recordable user area in which program data can be actually recorded.

A zone in the groove area before the recordable user area start address (RSTA) is a control area used for controlling recording and playback operations. The U-TOC described above is recorded in this control area. A zone in the control area with a size of 1 cluster starting from the power-calibration area start address (PCA) is an area for calibrating the power of the laser beam.

The U-TOC is a contiguous zone in the control area having a size of 3 clusters starting from the U-TOC start address (USTA). As described above, 1 cluster is 36 sectors.

Actual program data is recorded in the recordable user area as shown in the example of FIG. 4. In this example, 4 tracks M1 to M4 are recorded.

The first track M1 is recorded in a part at addresses A0 to A1. The second track M2 is recorded in two parts. To be more specific, an early portion M2-1 of the second track M2 is recorded in one of the parts at addresses A2 to A3 and the later portion M2-2 is recorded in the other part at addresses A6 to A7. The third track M3 is recorded in a part at addresses A4 to A5 and the fourth track M4 is recorded in a part at addresses A8 to A9.

In this state, a free area with no program recorded therein corresponds to a part at addresses A10 to A11.

FIGS. 5A and 5B are diagrams showing typical data of the U-TOC in the state shown in FIG. 4.

The hyphen "-" shown in FIGS. 5A and 5B represents 1-byte data of 00h set in a part-descriptor pointer or link information in a part descriptor and 3-byte data of 000000h set in start and end addresses in a part descriptor in the U-TOC.

In the example, no defect is assumed to exist in the recordable user area on the disc 1. Thus, the defective-area part-descriptor pointer P-DFA is set at 00h.

In the recording state shown in FIG. 4, the part-descriptor pointer P-FRA points to a part descriptor for controlling a free area. In this example, the part-descriptor pointer P-FRA is set at 06h to point to a part descriptor 06h. FIG. 5B is a diagram showing information on a part serving as the free area with a start address of A10 and an end address of A11 as described above. To be more specific, the part descriptor 06h pointed to by the part-descriptor pointer P-FRA shown in FIG. 5A includes the start address A10 and the end address A11. Since there is no other free area in this case, the link information of the part descriptor 06h is set at 00h.

The start address A0 and the end address A1 of the first track M1 are described in the part descriptor 01h pointed to by the part-descriptor pointer P-TNO1. Since the first track M1 is recorded in only one part, the link information of the part descriptor 01h is set at 00h.

The start address A2 and the end address A3 of the second track M2 are described in the part descriptor 02h pointed to by the part-descriptor pointer P-TNO2. Since the second track M2 is recorded in two parts M2-1 and M2-2, however, A2 and A3 are the start and end addresses of the part M2-1 for recording the early portion of the second track M2. The link information of the part descriptor 02h is set for example at 04h to point to the part descriptor 04h describing the second part M2-2 for recording the later portion of the second track M2. The start address A6 and the end address A7 of the second part M2-2 are described in the part descriptor 04h. Since there is no more part for recording the second track M2, the link information of the part descriptor 04h is set at 00h to indicate that no further linking is required.

The locations of the parts for recording the third track M3 and the fourth track M4 are described in part descriptors pointed to by the part-descriptor pointers P-TNO3 and P-TNO4 respectively in the same way as the first track M1. It should be noted that, since only 4 programs are recorded, the part-descriptor pointers PTO5 to PTO255 are not used and, thus, each set at 00h.

The part-descriptor pointer P-EMPTY pointing to a first part descriptor of a plurality of unused part descriptors in the part-descriptor table is set to point to the first unused descriptor which is the part descriptor 07h in this case. The part descriptors 07h to FFh are all unused. The part descriptors 08h to FFh are linked to the part descriptor 07h sequentially to form a link list by using pieces of link information recorded in the part descriptors 07h to FEh with the part descriptor 07h placed at the head of the link list.

4. Seamless Recording Operation

Figures 6A, 6B:
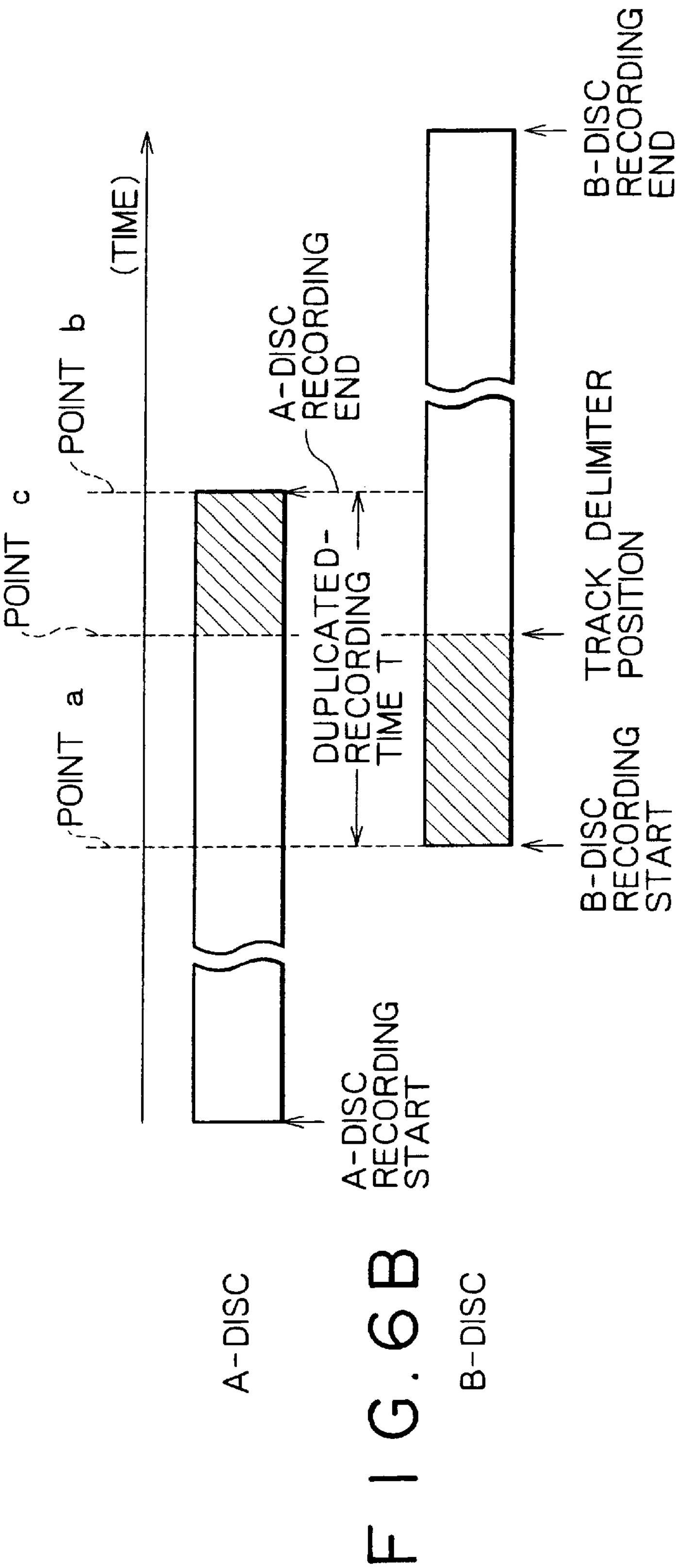
FIG. 6A is an explanatory diagram conceptually showing a seamless recording operation carried out on an A disc in accordance with the embodiment.
FIG. 6B is an explanatory diagram conceptually showing a seamless recording operation carried out on a B disc in accordance with the embodiment.

As described above, data is recorded into a plurality of discs, being spread over the discs in such a way that no information is lost. The concept of a seamless recording operation carried out in this embodiment is explained by referring to FIGS. 6A and 6B. FIG. 6A is a diagram showing the progress of an operation to record data on the A disc mounted on the A deck unit 0 along the time axis. Much like FIG. 6A, FIG. 6B is a diagram showing the progress of an operation to record data on the B disc mounted on the B deck unit 100 along the time axis.

In order to carry out seamless recording by using the recording/playback apparatus implemented by the embodiment, the user typically mounts at least the A disc on the A deck unit 0 and carries out a predetermined operation to set the apparatus in a seamless-recording mode before an operation to start the recording of a program.

The B disc can be mounted on the B deck unit 100 at the same time as the A disc or some time after the A deck has been mounted but before a period of duplicated-recording time to be described later lapses. The period of duplicated-recording time is referred to hereafter simply as a duplicated-recording time T.

A seamless recording operation is typically started in the recording/playback apparatus with the A disc mounted on the A deck unit 0 as shown in FIG. 6A. The recording/playback apparatus can have a configuration set in advance at the factory so as to carry out a seamless recording operation starting always with either the A deck unit 0 or the B deck unit 100, or a configuration wherein seamless recording can be started with either the A deck unit 0 or the B deck 100 unit arbitrarily selected by the user by carrying out a predetermined operation.

At a time indicated by a point a shown in FIG. 6A after the seamless recording operation to record data of a program has been started with the A disc mounted on the A deck unit 0 as described above, a recordable area is left on the A disc with a size not larger than a predetermined value corresponding to a recording time length. At this point of time, an operation to record the program into the B disc is started by the B deck unit 100 as shown in FIG. 6B with the operation to record the program into the A disc continued as it is as shown in FIG. 6A. That is to say, at time indicated by the point a, the recording/playback apparatus enters the-so called duplicated-recording time T in which the same data is recorded on both the A and B discs.

At a later time indicated by a point b, the recording area on the A disc mounted on the A deck unit 0 is all used up. Thus, the operation to record data into the A disc is ended at this point of time. The recording operation is continued by recording data into only the B disc mounted on the B deck unit 100 till the recording area on the B disc is all used up or the user carries out an operation to halt the recording.

In such a recording operation, the same data is recorded into a predetermined data segment at the end of the A disc and a predetermined data segment at the beginning of the B disc as shown in FIGS. 6A and 6B. A period of time during which the same data is recorded into the segments is known as a duplicated-recording time T. In this way, no information is lost from the data of the program recorded on the A and B discs.

The period of duplicated-recording time T can be set at any arbitrary length. It is desirable, however, to set T at about several minutes. This is because it is necessary to set a point c at the position of a track delimiter corresponding to a point of time in the duplicated-recording time T. The track delimiter will be described later. In a mini-disc system, program data is controlled in track units as described above. Normally, however, 1 track corresponds to a program. In general, a program has a length of several minutes.

The duplicated-recording time T is set at a length so that a point of time corresponding to a track delimiter is always included in T.

Assume that a data position indicated by the point c corresponding to a point of time in the duplicated-recording time T as shown in FIGS. 6A and 6B is the position of a delimiter of a track of recorded data. In this case, the point c is set as the position of a track delimiter in a recorded data sequence. The point c corresponds to a position at which a seamless playback operation is switched from the A disc to the B disc as described later.

The point c is detected automatically by using a typical technique as follows.

According to this technique, a detected low-level signal portion of recorded data is regarded as a signal generated at the position of a delimiter between two consecutive tracks. The point c is set at such a position.

Since 1 track generally corresponds to a program, a low-level signal is generated at the beginning and the end of a program. Thus, in most cases, a detected low-level signal is generated at the position of a delimiter between two consecutive tracks.

Processing to detect the aforementioned low-level signal portion in the recording/playback apparatus provided by the embodiment is carried out by the master controller 20 which obtains a signal from the low-level-signal detecting unit 27 in a configuration described as follows.

Data to be recorded is input as digital audio data by way of the A/D converter 17 or the digital interface unit 23. The low-level-signal detecting unit 27 monitors the input digital audio data. When the low-level-signal detecting unit 27 detects a state in which the monitored digital audio data as a signal becomes equal to or lower than a level set in advance as the level of the low-level signal continuously for a predetermined period of time, the low-level-signal detecting unit 27 outputs a detection signal to the master controller 20 to inform the master controller 20 that a low-level-signal portion has been detected as data.

If the master controller 20 receives the detection signal from the low-level-signal detecting unit 27 during the duplicated-recording time T of a seamless recording operation, the master controller 20 determines that the detection level indicates a low-level-signal period of recorded data and sets a point c typically in the middle of the low-level-signal period.

If data to be recorded is digital audio data which has a structure conforming to digital audio interface specifications and is input by way of the digital interface 23, for example, instead of detecting a low-level-signal portion, the position of a track delimiter can be detected as follows.

In the case of such digital audio data, information such as a track number and a performance time is recorded in a sub-code area. The master controller 20 decodes a sub-code of digital audio data supplied thereto in order to detect the position of a track delimiter in the data, allowing a point c to be set.

The master controller 20 transfers the information on the position of the point c set by using the technique described above to the system controller 11 employed in the A deck unit 0 and the system controller 111 employed in the B deck unit 100. The system controllers 11 and 111 each save an address on the disc 1 corresponding to position of the point c. That is to say, the address on the disc 1 indicates the position of a track delimiter in an area corresponding to the duplicated-recording time T. As will be described later, data following the point c on the A disc and data preceding the point c on the B disc are erased by referring to the addresses saved by the system controllers 11 and 111 respectively.

The configuration for detecting the position of a track delimiter required for setting a point c as described above is provided in a mini-disc system in most cases due to the fact that track delimiters in recorded data need to be detected automatically during a recording operation. That is to say, this embodiment is capable of setting a point c by utilizing a configuration used conventionally for detecting the position of a track delimiter.

At a stage the operation to record data onto the A and B discs is ended, the contents of the U-TOCs of the discs are updated in accordance with the results of the recording operation. In this embodiment, information associated with data recorded after the point c indicated by a hatched box in FIG. 6A is deleted from the U-TOC of the A disc. That is to say, the U-TOC is updated so as to treat an area used to be occupied by the data, which has been recorded after the point c but erased from the A disc, as a free area. By the same token, information associated with data recorded before the point c indicated by a hatched box in FIG. 6B is deleted from the U-TOC of the B disc. That is to say, the U-TOC is updated so as to treat an area used to be occupied by the data, which has been recorded before the point c but erased from the B disc, as a free area.

The operation carried out as described above results in a recording state in which the data recorded on the A disc is terminated at the end of a track and the data recorded on the B disc starts at the beginning of a track.

No information between the data recorded on the A disc and the data recorded on the B disc is lost and, in addition, the data recorded on the A disc is not terminated in a middle of a track and the data recorded on the B disc does not start in a middle of a track. As a result, data recorded on the A and B discs can be played back separately as the user likes and a library of such discs can be controlled by the user with ease.

In a seamless playback operation to be described later, for example, sound can be continuously played back with ease by taking advantage of the fact that, in general, a gap existing between two consecutive tracks corresponds to a portion of a low-level signal for a period of time lasting to a certain degree without the need to purposely provide a function to output an audio signal by well joining pieces of data in a middle of a track at a time the playback operation of the deck unit is switched from the A disc to the B disc.

As described above, the seamless recording operation is started with the A disc mounted on the A deck unit 0 and ended with the B disc mounted on the B deck unit 100. If it is desired to further continue the seamless recording operation at the end of the B deck, a new A disc needs to be mounted on the A deck unit 0 before another duplicated-recording time T is encountered in the operation to record data onto the B disc. Then, the seamless recording operation can be continued by setting the other duplicated-recording time T as described earlier by referring to FIGS. 6A and 6B. Thereafter, the seamless recording operation can be switched from one disc to another by repeating the processing described above.

Since the operation to record data onto the A and B discs is carried out in a mini-disc system using a technique described by referring to FIGS. 6A and 6B, the technique can be applied to a scheme in which a track is recorded into a plurality of discrete parts as described by referring to FIGS. 4 and 5.

Figures 7A, 7B:
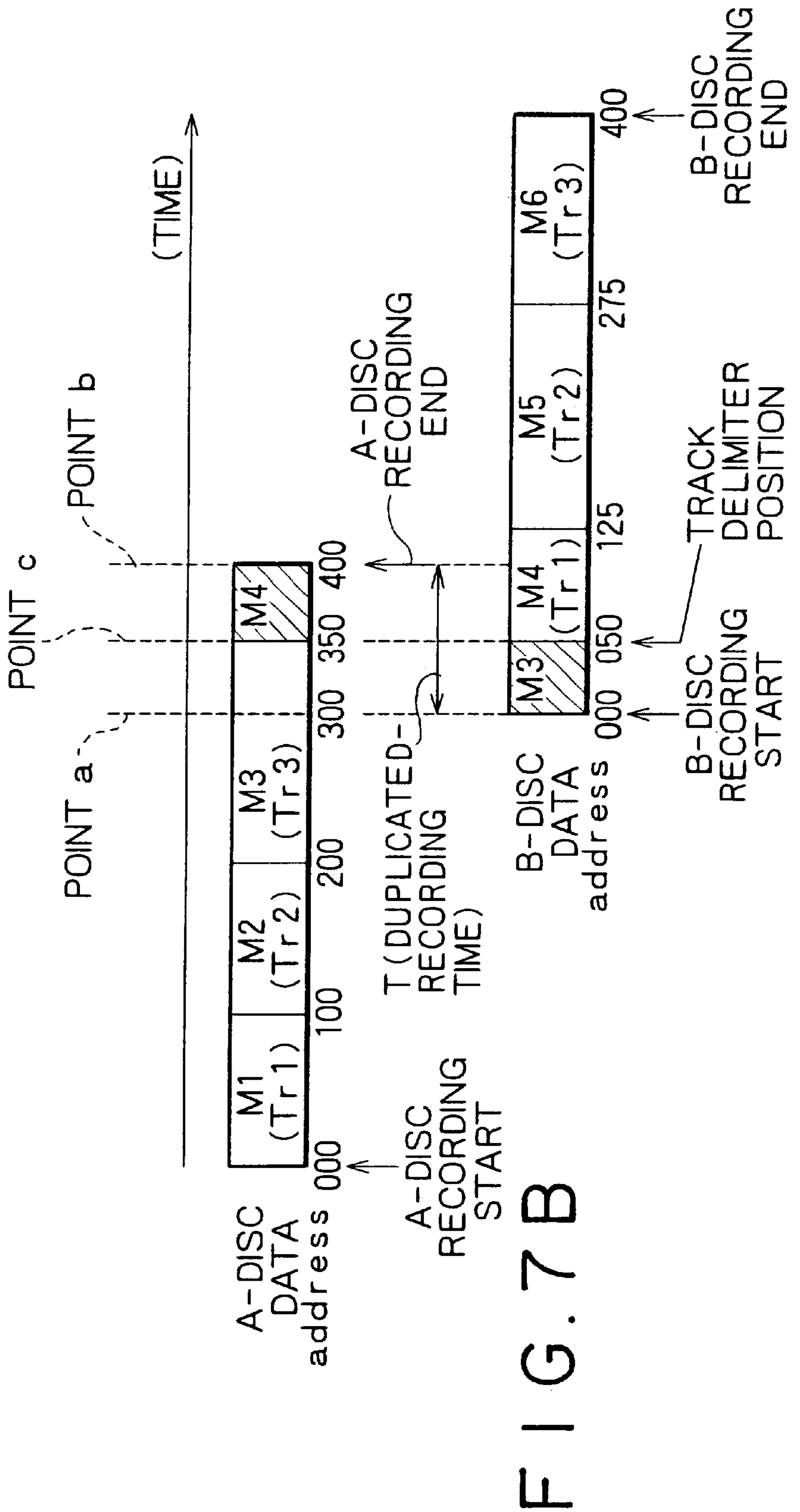
FIG. 7A is an explanatory diagram used for describing a concrete example of a seamless recording operation carried out on an A disc in accordance with the embodiment.
FIG. 7B is an explanatory diagram used for describing a concrete example of a seamless recording operation carried out on a B disc in accordance with the embodiment.

FIGS. 7A and 7B are diagrams showing a typical model of the seamless recording operation described by referring to FIGS. 6A and 6B. FIGS. 7A and 7B show changes in recording state occurring in the A and B discs respectively with the lapse of the recording time in terms of tracks. To be more specific, FIGS. 7A and 7B show changes in recording state of the recordable user areas occurring in terms of tracks in the A and B discs respectively. For the sake of convenience, the address A0 and the lead-out address LOA shown in FIG. 4 are shown as addresses 000 and 400 respectively in FIGS. 7A and 7B. Thus, the actual range of the recordable user area starts from the address 000 representing the recordable user area start address RSTA to an address of 399 immediately preceding the address 400.

In the example shown in FIGS. 7A and 7B, a seamless recording operation is started with the A disc mounted on the A deck unit 0 and continued to the B disc mounted on the B deck unit 100. To make the explanation easy to understand, let the A and B discs be each a virgin disc. Assume that data can be recorded onto physically continuous tracks on the A and B discs, resulting in no state in which the data is split into separated discrete parts.

In a state shown in FIG. 7A, the recording operation is started with the A disc to record tracks M1, M2, M3 and M4 with the lapse of time into a sequence of parts beginning at addresses 000, 100, 200 and 350 and ending at addresses 099, 199, 349 and 399 respectively.

Assume that a recording remaining time used as a duplicated-recording time T is set at 100 address units. To be more specific, a point a is set at a data position immediately following an address of 299 in a part for recording the track M3. The operation to record data of the track M3 following the data position corresponding to the point a on the B disc is started at a time indicated by the point a. As shown in FIG. 7B, the recording operation of the B disc is carried out to record tracks M3, M4, M5 and M6 with the lapse of time into sequential parts beginning at addresses 000, 050, 125 and 275 and ending at addresses 049, 124, 274 and 399 respectively.

As shown in FIG. 7A, the recording operation on the A disc is ended in a middle of the track M4 and, as shown in FIG. 7B, the recording operation on the B disc is ended with the track M6.

As a result of the recording operations described above, data recorded during the duplicated-recording time T onto both the A and B discs is the last portion of the track M3 having a size of 50 address units and the early portion of the track MA with a size of 50 address units following the last portion of the track M3.

In this case, a point c indicating the position of a track delimiter in the duplicated-recording time T is set between the tracks M3 and M4. The track delimiter is located at an address of 349 on the A disc or an address of 049 on the B disc.

After the recording operation described above is completed, the tracks M1, M2 and M3 on the A disc for recording data are registered as tracks #1, #2 and #3 respectively and the part used as a recording area for recording data of the later portion of the track M4 actually following the track M3 is treated as a free area. That is to say, the data recorded in this part is erased.

In the B disc, on the other hand, the part at the beginning of the B disc for recording the data of the later portion of the track M3 is erased and regarded as a free area. The tracks M4, M5 and M6 for recording data following the track M3 are registered as tracks #1, #2 and #3 respectively.

Control of data in track units as described above is implemented by updating the contents of the U-TOC of each disc. The contents of the U-TOCs of the A and B discs representing recording states of the A and B discs resulting from the seamless recording operation shown in FIGS. 7A and 7B are shown in FIGS. 8 and 9 respectively.

FIG. 8 is a diagram showing details of data recorded in the U-TOC of the A disc to reflect the recording state of the disc.

As shown in the figure, the data recorded in the U-TOC of the A disc includes the part-descriptor pointer P-TNO1 for track #1 which is set at 01h to point to the part descriptor 01h. The part descriptor 01h is used for cataloging the start address 000 and the end address 099 of a part for storing the track M1. The link information of the part descriptor 01h is set at 00h to indicate that the part descriptor 01h is linked to nothing.

The part-descriptor pointer P-TNO2 for track #2 is set at 02h to point to the part descriptor 02h which is used for cataloging the start address 100 and the end address 199 of a part for storing the track M2. The link information of the part descriptor 02h is set at 00h to indicate that the part descriptor 02h is linked to nothing.

The part-descriptor pointer P-TNO3 for track #3 is set at 03h to point to the part descriptor 03h which is used for cataloging the start address 200 and the end address 349 of a part for storing the track M3. The link information of the part descriptor 03h is set at 00h to indicate that the part descriptor 03h is linked to nothing.

Data of the track M4 recorded in a part is deleted and the part is treated as a free area. The part treated as a free area is described by the part descriptor 04h pointed to by the part-descriptor pointer P-FRA set at 04h. The start address 350 and the end address 399 of the free area are cataloged in the part descriptor 04h. Since the entire recordable user area ending at the address 349 immediately preceding the start address 350 of the free area is used for recording data, the link information of the part descriptor 04h is set at 00h to indicate that the part described by the part descriptor 04h is the only free area.

The part-descriptor pointer P-EMPTY is set at 05h to indicate that the part descriptor 05h is not used. The part descriptors 06h to FFh are linked to the part descriptor 05h by using pieces of link information included in the part descriptors 05h to FEh to form a link list of unused part descriptors in the part-descriptor table with the part descriptor 05h placed at the head of the link list. The link information of the part descriptor FFh is set at 00h to indicate that the part described by the part descriptor FFh is the last unused part descriptor on the link list.

FIG. 9 is a diagram showing details of data recorded in the U-TOC of the B disc to reflect the recording state of the disc.

Data of the track M3 recorded in a part at the beginning of the B disc is deleted and the part is treated as a free area. The part treated as a free area is described by the part descriptor 01h pointed to by the part-descriptor pointer P-FRA set at 01h. The start address 000 and the end address 049 of the free area are cataloged in the part descriptor 01h. Since the entire recordable user area starting at the address 050 and ending at the address 399 is used for recording data as shown in FIG. 7B, the link information of the part descriptor 01h is set at 00h to indicate that the part described by the part descriptor 01h is the only free area.

The part-descriptor pointer P-TNO1 for the track #1 is set at 02h to point to the part descriptor 02h which is used for cataloging the start address 050 and the end address 124 of a part for storing the track M4. The link information of the part descriptor 02h is set at 00h to indicate that the part descriptor 02h is linked to nothing.

The part-descriptor pointer P-TNO2 for track #2 is set at 03h to point to the part descriptor 03h which is used for cataloging the start address 125 and the end address 274 of a part for storing the track M5. The link information of the part descriptor 03h is set at 00h to indicate that the part descriptor 03h is linked to nothing.

The part-descriptor pointer P-TNO3 for track #3 is set at 04h to point to the part descriptor 04h which is used for cataloging the start address 275 and the end address 399 of a part for storing the track M6. The link information of the part descriptor 04h is set at 00h to indicate that the part descriptor 04h is linked to nothing.

The part-descriptor pointer P-EMPTY and the part descriptors 05h to FFh are set in the same states as those for the U-TOC of the A disc shown in FIG. 8.

5. Processing of the Seamless Recording Operation

Figure 10:
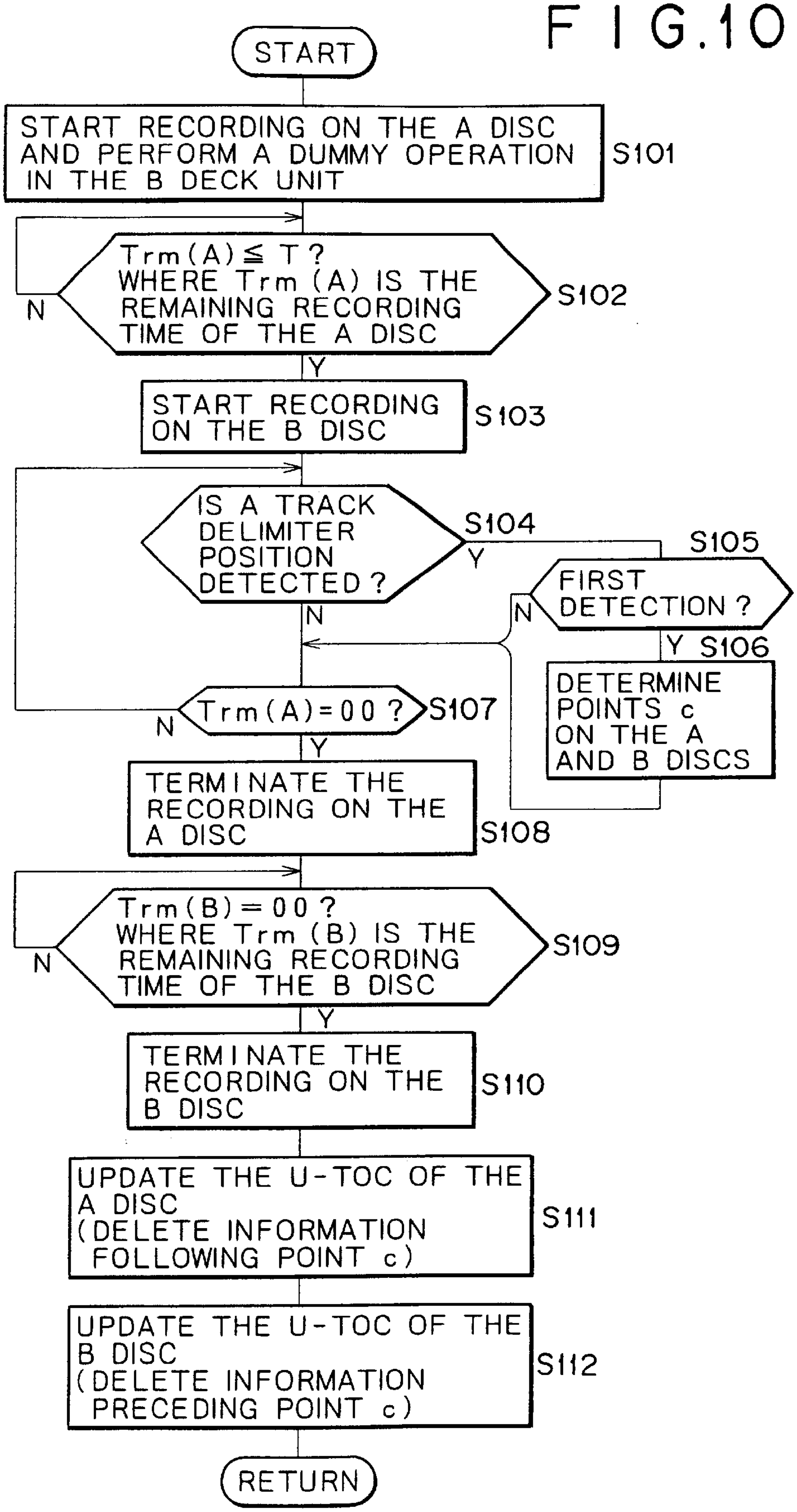
FIG. 10 is a flowchart representing processing to implement a seamless recording operation provided by the embodiment.

Processing to implement a seamless recording operation is explained by referring to a flowchart shown in FIG. 10. The processing represented by the flowchart shown in this figure is carried out by performing control processing of the master controller 20 itself and control processing appropriately for the system controller 11 of the A deck unit 0 and the system controller 111 of the B deck unit 100 through execution of control of the master controller 20.

In this example, the seamless recording operation begins with recording of data in the A deck 0 to be continued to recording of data in the B deck 100. To make the explanation easy to understand, the seamless recording operation is ended when the recording of data in the B deck 100 is completed.

As shown in the figure, the flowchart begins with a step S101 when the user sets the recording/playback apparatus in a seamless recording mode to start a seamless recording operation. At the step S101, the A deck 0 carries out control processing to start an operation to record data onto the A disc mounted on the A deck unit 0.

In this embodiment, the B deck unit 100 carries out control processing to perform a dummy operation synchronized with the A deck unit 0 also at the step S101.

At that time, the system-clock generating circuit 26 supplies the same system-clock signal for signal processing to both the A deck unit 0 and the B deck unit 100.

Then, the A deck unit 0 carries out signal processing based on the system-clock signal to actually record audio data supplied thereto onto the A disc. On the other hand, the B deck unit 100 shares and fetches the audio data supplied to the A deck unit 0 to carry out signal processing but actually record no data onto the B disc. The signal processing carried out by the B deck unit 100 is known as a dummy operation.

Since the A deck unit A and the B deck unit 100 are each carrying out signal processing of the same input data based on the same clock signal, the pieces of processing are done with synchronized signal-processing timing.

Since the A deck unit 0 records data onto the A disc while the B deck unit 100 is carrying out a dummy operation as described above, the B deck unit 100 can be driven with ease to start recording data at to a point of time indicated by the point a of FIG. 6A which is synchronized with the point a shown in FIG. 6B.

During a dummy operation in a deck unit, the disc mounted on the deck unit can be replaced without causing any problem.

At a step S102 following the step S101, the A deck unit 0 enters a state of waiting for a recording remaining time Trm (A) to become equal to or shorter than a duplicated-recording time T determined in advance. The recording remaining time Trm (A) is obtained as a result of conversion of the size of a recordable area left on the A disc into a period of time.

As the recording remaining time Trm (A) is judged to be equal to or shorter than the duplicated-recording time T at the step S102, the processing goes on to a step S103 at which the B deck unit 100 which has been carrying out the dummy operation so far executes control to start actual recording of data onto the B disc. At the start of the recording operation in the B deck unit 100, the master controller 20, the system controller 11 and the system controller 111 typically execute control to set a data write pointer in the buffer memory unit 113 of the B deck unit 100 at the same value as a data write pointer in the buffer memory unit 13 specified by the memory controller 12 in the A deck unit 0. The data write pointer is the address of a location in the buffer memory unit 13 or 113 from which data is to be transferred to the disc 1. As a result, data can be recorded into the B disc starting from a location accurately corresponding to a data position indicated by the point a shown in FIG. 6A.

A period of time for completing pieces of processing of the step S102 to a step S108 to be described later to record data onto the A disc is the duplicated-processing period T described earlier by referring to FIGS. 6A and 6B.

At the next step S104, an attempt is made to detect a track delimiter by using the detection technique described earlier. If a track delimiter is not detected, the flow of the processing goes on to a step S107. If a track delimiter is detected, on the other hand, the flow of the processing goes on to a step S105.

At the step S105, the detected track delimiter is checked to form a judgment as to whether or not the track delimiter is a track delimiter detected for the first time in the duplicated-recording time T at the step S104. If the track delimiter is not a track delimiter detected for the first time in the duplicated-recording time T, the flow of the processing proceeds to the step S107 without doing anything. If the track delimiter is a track delimiter detected for the first time in the duplicated-recording time T, on the other hand, the flow of the processing continues to a step S106 at which the position of the track delimiter is taken as the point c as explained earlier by referring to FIG. 6A and the addresses of data recording corresponding to the point c on the A and B discs are saved.

To put it in detail, the addresses are typically saved as follows. In the A deck unit 0, the system controller 11 inputs an address on the A disc at which data corresponding to the point c is recorded from the address decoder 10 by way of the encoder & decoder unit 8 and stores the address in typically an internal RAM (Random-Access Memory) thereof. By the same token, in the B deck unit 100, the system controller 111 inputs an address on the B disc at which data corresponding to the point c is recorded from the address decoder 110 by way of the encoder & decoder unit 108 and stores the address in typically an internal RAM thereof.

After completing the processing of the step S106, the flow goes on to the step S107.

According to the processing carried out at the step S105, second and subsequent track delimiters detected during the duplicated-recording time T are ignored and no points c are set for such track delimiters. This is because, as is obvious from the earlier description referring to FIG. 6A, the point c also corresponds to a location to switch a playback operation from one to another of the two discs which have undergone a seamless recording operation. Thus, only one point c needs to be set in the duplicated-recording time T. That is to say, it is not necessary to set two or more points c. The processing of the step S105 is carried out so that only one point c is set in the duplicated-recording time T.

At the step S107, the recording remaining time Trm (A) of the A disc is examined to form a judgment as to whether or not Trm (A) has become equal to 00, that is, whether or not the entire recordable area on the A disc has been used up for recording data.

If the recording remaining time Trm (A) of the A disc has not become equal to 00, the flow of the processing goes back to the step S104. If the recording remaining time Trm (A) of the A disc has become equal to 00, on the other hand, the flow of the processing goes on to a step S108 at which the operation to record data onto the A disc carried out by the A deck unit 0 is ended. The processing described below is carried out after the point c shown in FIGS. 6A and 6B. That is to say, the recording operation is continued to an operation to record data on the B disc carried out by the B deck unit 100.

At a step S109, the B deck unit 100 enters a state of waiting for a recording remaining time Trm (B) of the B disc to become equal to 00, that is, the entire recordable area on the B disc to be used up for recording data.

As the recording remaining time Trm (B) of the B disc is judged to be equal to 0 at the step S109, the flow of the processing goes on to a step S110 at which control processing is performed to end the operation to record data onto the B disc carried out by the B deck unit 100.

If the user carries out an operation to terminate the operation to record data onto the B disc carried out by the B deck unit 100, the flow of the processing also goes on to the step S110 at which control processing is performed to end the operation to record data onto the B disc carried out by the B deck unit 100. It should be noted, however, that this feature is not depicted explicitly in the flowchart shown in FIG. 10.

At the next step S111, the U-TOC of the A disc is updated in accordance with the results of the recording operation carried out so far. By the same token, at the next step S112, the U-TOC of the B disc is updated in accordance with the results of the recording operation carried out so far before a departure from the routine represented by the flowchart shown in FIG. 10. The pieces of processing carried out at the steps S111 and S112 put the U-TOCs of the A and B discs in states shown concretely for example in FIGS. 8 and 9 respectively wherein ascending track numbers are assigned to tracks used for recording programs so far for controlling tracks in an order the programs have been recorded. In addition, a data recording area on the A disc following the point c and a data recording area on the B disc preceding the point c are each treated as a free area.

According to the processing flowchart described above, the flow can be continued from the step S104 to the step S108 by way of the step S107, skipping the steps S105 and S106.

The above flow of processing corresponds to a case in which the operation to record data on the A disc is ended without detecting a track delimiter since the start of the duplicated-recording time T due to typically a very long track program. In such a case, the pieces of processing of the step S108 and the subsequent steps are carried out without setting a point c. Thus, a particular piece of processing is not carried out at the step S111 to update the U-TOC of the A disc to set a data recording area corresponding to a later portion of the duplicated-recording time T as a free area. By the same token, a particular piece of processing is also not carried out at the step S112 to update the U-TOC of the B disc to set a data recording area corresponding to an early portion of the duplicated-recording time T as a free area. That is to say, an action is taken to leave data recording areas indicated by hatched blocks in FIGS. 6A and 6B or FIGS. 7A and 7B as areas from which data can be played back.

It is of course possible to configure the embodiment described above so as to allow a seamless recording operation to be carried out by the A deck unit 0 and the B deck unit 100 over 3 or more discs. Processing to implement such a configuration can also be designed on the basis of the processing described by referring to the flowchart shown in FIG. 10.

6. Processing of the Seamless Playback Operation

Figure 11:
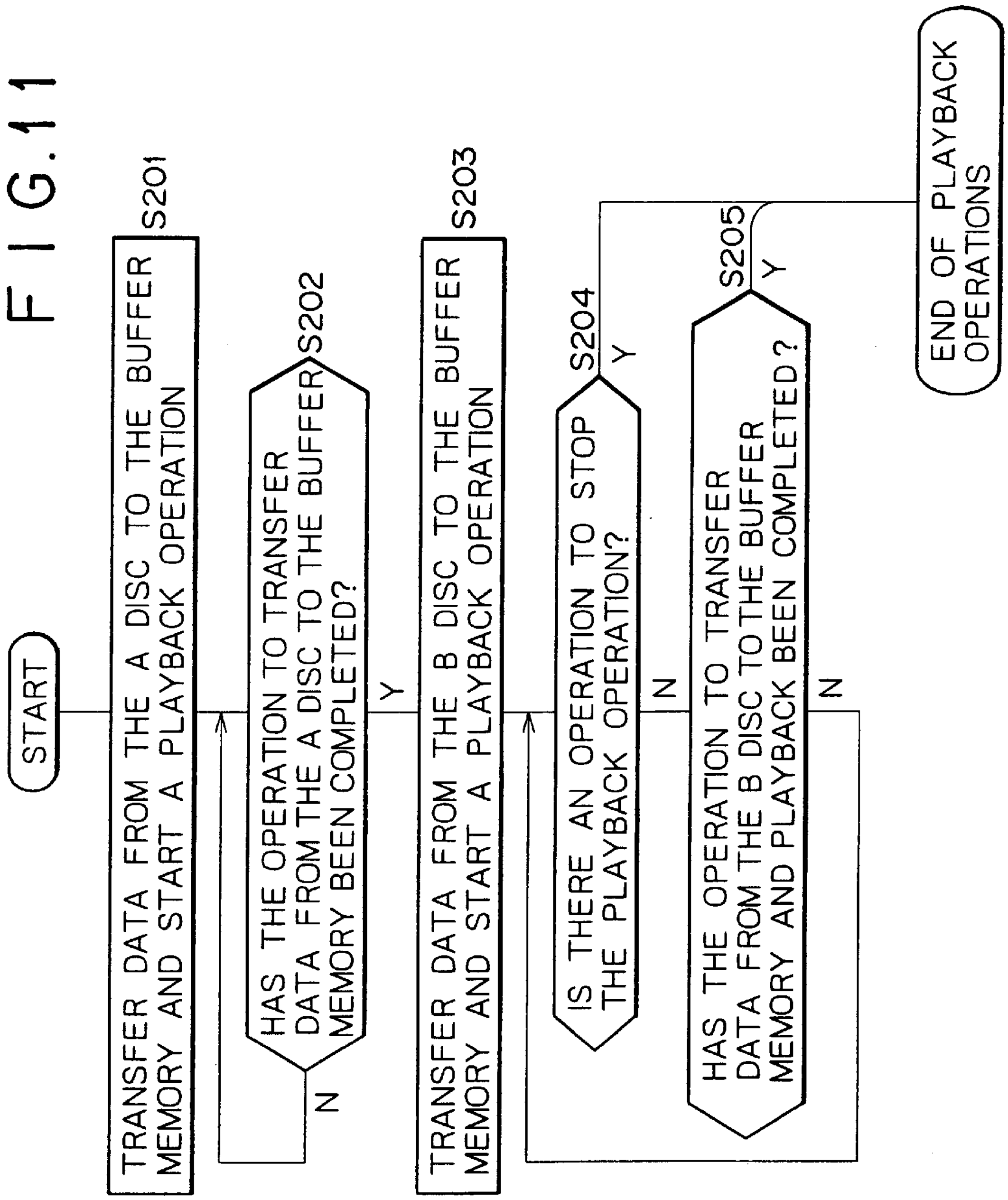
FIG. 11 is a flowchart representing processing to implement a seamless playback operation provided by the embodiment.

Processing to implement a seamless recording operation is explained by referring to a flowchart shown in FIG. 11. In the seamless recording operation, data is played back from discs completing a seamless recording operation without losing information.

The processing represented by the flowchart shown in this figure is carried out by performing control processing of the master controller 20 itself and control processing appropriately for the system controller 11 of the A deck unit 0 and the system controller 111 of the B deck unit 100 through execution of control of the master controller 20.

In this example, the seamless playback operation begins with reproduction of data in the A deck 0 to be continued to reproduction of data in the B deck 100. To make the explanation easy to understand, the seamless playback operation is ended when the reproduction of data in the B deck 100 is completed.

Typically, the user mounts the A and B discs completing a seamless recording operation on the A deck unit 0 and the B deck unit 100 respectively before carrying out an operation to start playback processing in a seamless playback mode.

It should be noted that the B disc can also be mounted on the B deck unit 100 while the playback operation of the A disc is under way.

As shown in the figure, the flowchart begins with a step S201 at which the A deck 0 carries out control processing to start an operation to play back data from the A disc mounted on the A deck unit 0.

A playback operation in this case means processing to read out data from the A and B discs, store the data in the buffer memory units 13 and 113 respectively and transfer the data to the audio-compression encoder & audio-decompression decoder units 14 and 114 respectively.

At the following step S202, the A deck unit 0 enters a state of waiting for the operation to store data read out from the A disc into the buffer memory unit 13 to be completed. As the operation to store data read out from the A disc into the buffer memory unit 13 is judged to have been be completed, the flow of the processing goes on to a step S203 at which the B deck 100 carries out control processing to start an operation to play back data from the B disc mounted on the B deck unit 100 and store the data into the buffer memory unit 113. At a point of time this operation is started, the A deck unit is continuing an operation to transfer remaining data stored in the buffer memory unit 13 to the audio-compression encoder & audio-decompression decoder unit 14.

The B deck unit 100 starts an operation to transfer data stored in the buffer memory unit 113 to the audio-compression encoder & audio-decompression decoder unit 114 with timing synchronized to the end of the operation to transfer remaining data stored in the buffer memory unit 13 to the audio-compression encoder & audiode-compression decoder unit 14 carried out by the A deck unit 0.

The timing to start a playback operation in the B deck unit 100 is synchronized with the timing to end a playback operation in the A deck unit 0 as follows. In the first place, the same clock signal is supplied by the system-clock generating circuit 26 to the A deck unit 0 and the B deck unit 100. In the second place, a time interval at which data of a predetermined word count is transferred from the buffer memory unit 13 to the audio-compression encoder & audio-decompression decoder unit 14 is prescribed. In the third place, when a transfer of data from the buffer memory unit 13 to the audio-compression encoder & audio-decompression decoder unit 14 is ended, an operation to transfer data from the buffer memory unit 113 to the audio-compression encoder & audio-decompression decoder unit 114 is started in the B deck unit 100 synchronously with this transfer timing. The timing control is executed by letting the system controller 11 carry out necessary control processing in collaboration with the system controller 111.

The flow of the processing then goes on to a step S204 to form a judgment as to whether or not the user has carried out an operation to halt the playback operation. If the user has carried out an operation to halt the playback operation, the operation to play back data from the B disc carried out so far is terminated and the routine represented by the flowchart shown in FIG. 11 is ended. If the user has not carried out an operation to halt the playback operation, on the other hand, the flow of the processing proceeds to a step S205.

The flow continues to the step S205 to form a judgment as to whether or not the playback processing comprising the operation to store data read out from the B disc into the buffer memory unit 113 and the operation to transfer data from the buffer memory unit 113 to the audio-compression encoder & audio-decompression decoder unit 114 has been completed. If not completed yet, the flow of the processing goes back to the step S204. If the playback processing is judged to have been completed, on the other hand, the playback processing is ended prior to a departure from the routine represented by the flowchart shown in FIG. 11.

Also in the case of a seamless playback operation, it is possible to provide a configuration in which, by sequentially switching the playback processing from the A deck unit 0 to the B deck unit 100 back and forth alternately, data can be played back seamlessly from 3 or more discs, and the playback operation can be implemented with ease on the basis of the processing represented by the flowchart shown in FIG. 11.

7. Second Embodiment

Next, the second embodiment of the present invention is explained.

Figure 12:
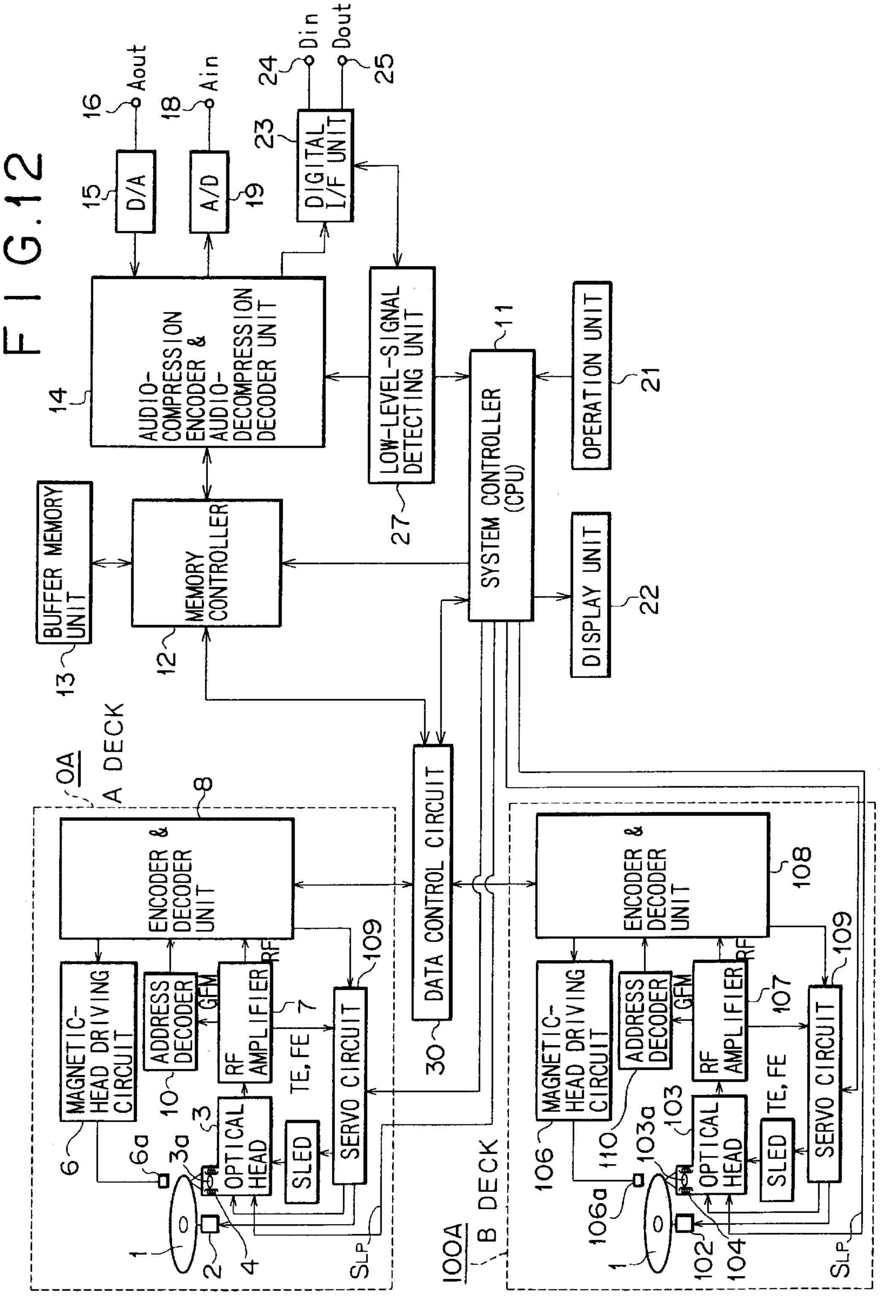
FIG. 12 is a block diagram showing a typical configuration of a recording/playback apparatus implemented by a second embodiment of the present invention.

FIG. 12 is a block diagram showing the configuration of a recording/playback apparatus implemented by the second embodiment. Components identical with those employed in the recording/playback apparatus implemented by the first embodiment shown in FIG. 1 are denoted by the same reference numerals as the latter and their explanation is not repeated.

As shown in FIG. 12, in the second embodiment, an A deck unit 0A and a B deck unit 100A share a data control circuit 30, the memory controller 12, the buffer memory unit 13, the audio-compression encoder & audio-decompression decoder unit 14 and input output components for inputting and outputting analog information to and from the audio-compression encoder & audio-decompression decoder unit 14. The input/output components are the D/A converter 15, the audio output terminal 16, the A/D converter 19 and the audio input terminal 18. The system controller 11, which carries out functions of the master controller 20 of the first embodiment including the overall control of the recording/playback apparatus, and digital input/output components for inputting and outputting digital data to the system controller 11 are also elements common to the A deck unit 0A and the B deck unit 100A. The digital input/output components are the digital interface unit 23, the digital input terminal 24 and the digital output terminal 25.

In this configuration, data stored in the memory buffer unit 13 can be transferred to both the encoder & decoder unit 8 employed in the A deck unit 0A and the encoder & decoder unit 108 employed in the B deck unit 100A by way of the memory controller 12 and the data control circuit 30.

In a recording or playback operation, for example, the data control circuit 30 forms a data transfer path between the memory controller 12 and the encoder & decoder unit 8 employed in the A deck unit 0A or the encoder & decoder unit 108 employed in the B deck unit 100A. Particularly in a recording operation, the data control circuit 30 is a functional circuit member forming a data transfer path from the memory controller 12 to both the encoder & decoder unit 8 employed in the A deck unit 0A and the encoder & decoder unit 108 employed in the B deck unit 100A. The operation of the data control circuit 30 is controlled by the system controller 11.

In this configuration, the common functional circuit members, that is, the recording/playback-signal processing system, are shared by the A deck unit 0A and the B deck unit 100A. Since the common functional circuit members are provided separately from the functional circuit members for reading out and writing data from and into the discs, it is not necessary to provide a clock signal common to the A deck unit 0A and the B deck unit 100A. Thus, the system-clock generating circuit 26 employed in the first embodiment shown in FIG. 1 can be eliminated. In the case of the second embodiment shown in FIG. 12, the low-level-signal detecting unit 27 is provided to detect a low-level signal of audio data output by the audio-compression encoder & audio-decompression decoder unit 14 either before or after compression. It should be noted, however, that the low-level-signal detecting unit 27 can also be provided to detect a low-level signal of audio data output by either the A/D converter 19 or the digital interface unit 23 as is the case with the first embodiment shown in FIG. 1.

Also in the recording/playback apparatus provided by the second embodiment with such a configuration, it is possible to implement a seamless recording operation based on the processing represented by the flowchart shown in FIG. 10.

In the configuration of the second embodiment, when the operation to record data onto the B disc is started at the step S103 following the step S102 at which an acknowledgment outcome of the judgment has been obtained, the operation of the data control circuit 30 is controlled so that data read out from the buffer memory unit 13 and transferred so far to only the encoder & decoder unit 8 employed in the A deck unit 0A is thereafter transferred also to the encoder & decoder unit 108 employed in the B deck unit 100A.

By the same token, in the recording/playback apparatus provided by the second embodiment with such a configuration, it is also possible to implement a seamless playback operation based on the processing represented by the flowchart shown in FIG. 11.

In this case, the data control circuit 30 forms a data transfer path from the encoder & decoder unit 8 employed in the A deck unit 0A to the memory controller 12, and playback data read out from the A disc is stored in the buffer memory unit 13. At a point of time the operation to play back data from the A disc is completed, the data control circuit 30 forms a data transfer path from the encoder & decoder unit 108 employed in the B deck unit 100A to the memory controller 12, an operation to read out data from the B disc is started and playback data read out from the B disc is stored in the buffer memory unit 13.

At that time, a pointer to the buffer memory unit 13 is set properly so that the playback data read out from the B disc and stored in the buffer memory unit 13 is correctly joined to the playback data read out earlier from the A disc. To put it in detail, the beginning of the playback data read out from the B disc immediately follows the end of the playback data read out from the A disc. As a result, the playback program can be output without an intermission.

In the second embodiment, the U-TOCs of the A and B discs are automatically updated so that an area for recording data following the point c on the A disc and an area for recording data preceding the point c on the B disc are each treated as a free area. It should be noted, however, that the user is also capable of carrying out an edit operation to produce the same recording state instead of having the U-TOCs updated automatically.

The area for recording data following the point c on the A disc and the area for recording data preceding the point c on the B disc can each also be treated as a reproducable area instead of a free area. Also in this case, it is possible to carry out a seamless playback operation in which data of these areas is not reproduced in duplicated processing.

In the example shown in FIGS. 7A and 7B, areas each indicated by a hatched block can each be treated as a reproducable area.

In this case, a part on the A disc for recording the track M4 is treated as track #4. Parts on the B disc for recording the tracks M3, M4, M5 and M6 are treated as tracks #1, #2, #3 and #4 respectively.

Particularly in a seamless playback mode, when an operation to play back data from track #3 for recording M3, a track immediately preceding the track M4 on the A disc, is completed, the playback operation of the A disc is ended without playing back data from track #4 for recording M4. When an operation to play back data from the B disc is started upon completion of the playback operation of the A disc, data of a part for recording M3, the first track or track #1, is not played back. Instead, an operation to play back data from a part for recording M4 or track #2 is started.

8. Third Embodiment

Next, third embodiment of the present invention is described.

Figure 13:
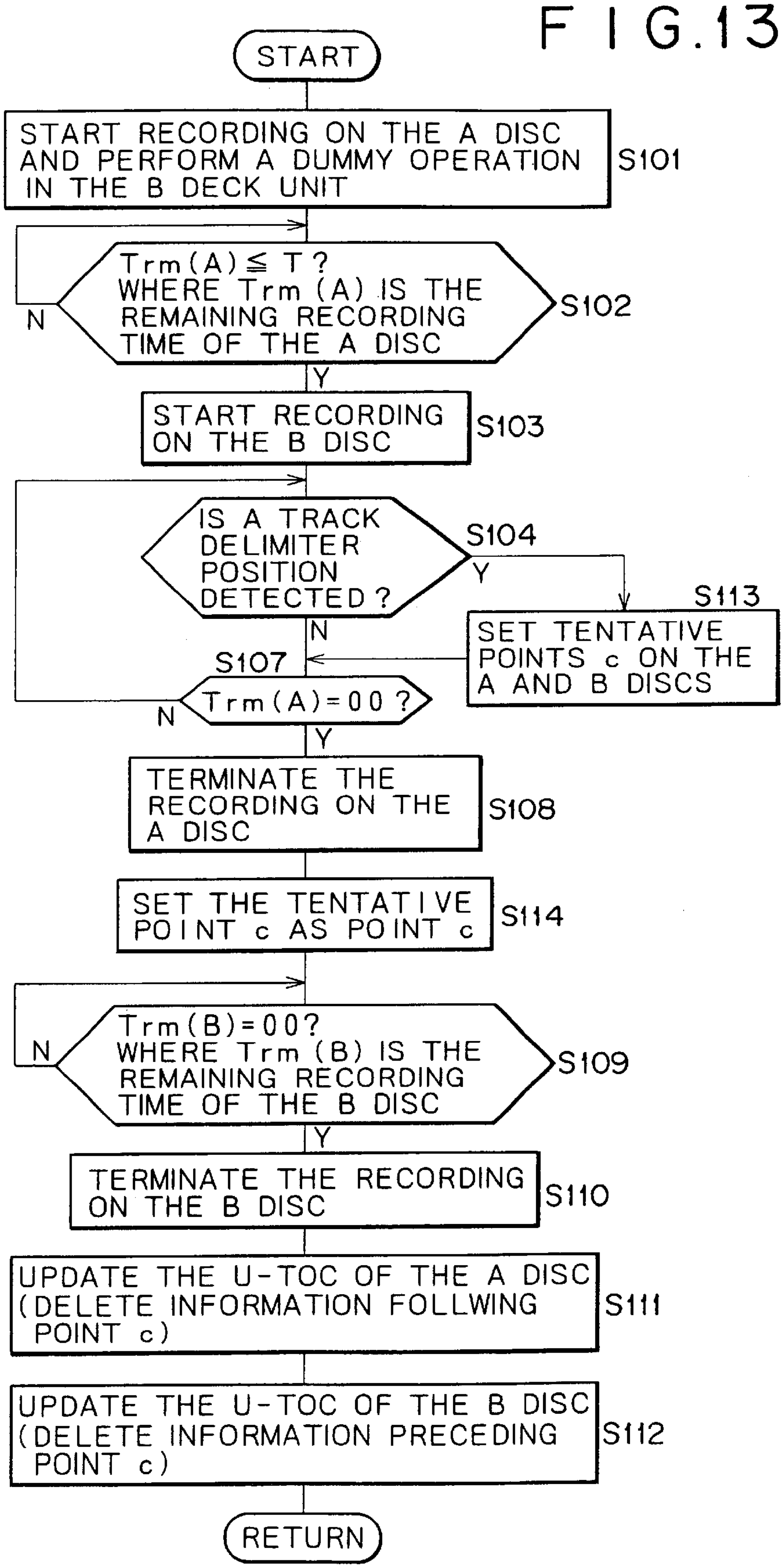
FIG. 13 is a flowchart representing a seamless recording operation carried out by a recording/playback apparatus implemented by a third embodiment of the present invention.

FIG. 13 is a flowchart representing processing to implement a seamless recording operation provided by the third embodiment. Steps identical with those of the flowchart of the first embodiment shown in FIG. 10 are denoted by the same reference numerals as the latter and their explanation is not repeated.

As shown in FIG. 13, in the third embodiment, when the position of a track delimiter is detected at the step S104, the flow of the processing goes on to a step S113 at which a point c indicating the position of the track delimiter as described earlier by referring to FIG. 6A is tentatively determined and data recording addresses corresponding to the point c on the A and B discs are each saved typically in an internal RAM as tentative information. Such addresses are saved each time the position of a track delimiter is detected at the step S104. The flow of the processing then proceeds from the step S113 to the step S107.

A step S114 is inserted between the steps S108 and S109. At the step S114, a point c tentatively determined at the step S113 is set as a point c indicating a formal position of a track delimiter. In addition, data recording addresses corresponding to the formal point c on the A and B discs are each saved as formal address information.

The flow of the processing then proceeds from the step S114 to the step S109.

In the case of the third embodiment, the eventually determined formal point c represents the position of a track delimiter detected last during the period of the duplicated-recording time T shown in FIGS. 6A and 6B. Assume for example that two or more track delimiters are detected during the period of the duplicated-recording if time T. In this case, since the point c represents the position of the last track delimiter, it is possible to use the A disc for,recording data of a maximum amount that can be recorded in a seamless recording operation. If only 1 or no track delimiter is detected during the period of the duplicated-recording time T, the third embodiment will provide the same recording effects as the first embodiment.

The embodiments are each an application of the present invention to a mini-disc system. It should be noted, however, that the present invention can also be applied to recording mediums other than the disc-shaped recording medium of the mini-disc system. For example, the present invention can also be applied to a recording/playback apparatus using recording media such as a tape-shaped recording medium and a solid-state memory.

As described above, according to the present invention, in a seamless recording operation carried out by a recording/playback apparatus provided with a plurality of deck units, when the size of a recordable area left on a recording medium mounted on one of the deck units to undergo a recording process first becomes equal to or smaller than a predetermined value, the seamless recording operation is continued to another deck unit. Thus, in the seamless recording operation, a predetermined segment at the end of the deck unit undergoing the recording process first overlaps a predetermined segment at the beginning of the other deck unit, resulting in duplicated segments in which recorded data is duplicated.

As a result, no information is lost from data recorded in the seamless recording operation, being spread over two recording mediums.

A pointer can be set to point to a particular position in the duplicated segments for recording the duplicated data on the two recording mediums. In a seamless playback operation, this pointer indicates a playback end point of a recording medium to undergo a playback process first and a playback start point of another recording medium to undergo a succeeding playback process.

By playing back data from the other recording medium to undergo a succeeding playback process upon completion of recording data on the recording medium undergoing a playback process first in a seamless playback operation as described above, data can be played back with at least no information lost from the recorded data.

In such a seamless playback operation, by ending the playback processing of the recording medium undergoing a playback process first at a data position pointed to by the pointer and starting the playback processing of the other recording medium to undergo a succeeding playback process at a data position pointed to by the same pointer, if the reproduced data is audio data for example, the audio data can be output continuously, allowing a program to be played back without causing the user to feel a sense of incompatibility.

By erasing data succeeding a position pointed to by the pointer from a recording medium undergoing a recording process first and data preceding a position pointed to by the same pointer from a recording medium undergoing a succeeding recording process in a seamless recording operation, in recorded data obtained as a result of the seamless recording operation, the end of data recorded on the recording medium undergoing a recording process first is continued by the beginning of data recorded on the recording medium undergoing a succeeding recording process. Thus, by typically listening to a program played back from the recording mediums, the fact that the two discs are related to each other can be identified with ease, making it easy for the user to control the discs through typically library management.

In the configuration described above, by setting the pointer to point to the position of a track delimiter, data recorded on a disc in a seamless recording operation will never end or begin in a middle of a track. As a result, it is easy for the user to execute the library management and use discs as the user likes.

As for the seamless playback operation, it is possible to provide a configuration for implementing seamless playback processing with ease by taking advantage of the fact that, in general, a gap existing between two consecutive tracks corresponds to a portion of a low-level signal without the need to purposely provide a function to output an audio signal by well joining pieces of audio data in a middle of a track so as to avoid a sound intermission.

In order to set a pointer to point to the position of a track delimiter as described above, it is necessary to detect a program delimiter by typically referring to sub-codes in data and set the pointer at the position of the detected program pointer. As an alternative, by taking advantage of the fact that a program delimiter normally corresponds to a data segment of a low-level signal existing between programs, it is also possible to set the pointer at a detected data segment of a low-level signal. This alternative can be implemented with ease by utilizing a configuration in which the function to detect a data segment of a low-level signal is provided from the beginning for purposes such as automatic track division in typically a recording operation.

In a recording/playback apparatus provided by the present invention with a configuration wherein a signal processing circuit system is provided for each of two or more deck units, the signal processing circuit system for a recording medium to undergo recording/playback processing first is synchronized with the signal processing circuit system for a recording medium to undergo subsequent recording/playback processing by supplying the same clock signal to both the systems. The signal processing circuit system for a recording medium to undergo subsequent recording processing is carrying out a dummy operation while the signal processing circuit system for a recording medium to undergo recording processing first is recording data into the recording medium thereof. In this way, the signal processing circuit system for a recording medium to undergo subsequent recording processing starts the subsequent recording processing from a position pointed to by a recording pointer having the same value as a recording pointer of the signal processing circuit system for a recording medium to undergo recording processing first. As a result, a seamless recording operation according to the present invention can be carried out with ease.

In a recording/playback apparatus provided by the present invention with a configuration wherein a common signal processing circuit system is shared among two or more deck units, control processing is carried out so that, at the beginning of subsequent recording processing carried out by a deck unit for a recording medium to undergo the subsequent recording processing, data supplied so far by the common signal processing circuit system to only a deck unit for a recording medium to undergo recording processing first is also supplied to the deck unit for a recording medium to undergo the subsequent recording processing. As a result, a seamless recording operation according to the present invention can be carried out with ease.

What is claimed is:

1. A recording apparatus for preserving recorded data continuously on a plurality of recording mediums in a recording operation even in the event of a switching of said recording operation from any one of said recording mediums to another, said apparatus comprising:

at least two recording means, namely, a first recording means and a second recording means;

a data switching means for supplying recorded data selectively to said recording means; and a wait-state terminating means for detecting a location in close proximity to an end point of a recordable area of a first recording medium mounted on said first recording means currently being subjected to an early recording operation and for starting a later recording operation of said second recording means having been waiting for said later recording operation to be started before an arrival of said early recording operation of said first recording means at said end point of said recordable area of said first recording medium.

2. A recording apparatus according to claim 1 wherein said data switching means makes data recorded in a zone in close proximity to said end point of said recordable area of said first recording medium mounted on said first recording means the same as data recorded in a zone in close proximity to a start point of a recordable area of said second recording medium mounted on said second recording means.

3. A recording apparatus according to claim 1 wherein said wait-state terminating means comprises:

a residual-size computing means for computing a size of a recordable area on said first recording medium;

an end-proximity detecting means for comparing a result of computation output by said residual-size computing means with a predetermined value indicating said location in close proximity to said end point of said recordable area of said first recording medium to detect an arrival of said early recording operation of said first recording means at said end point of said recordable area of said first recording medium; and a starting means for starting said later recording operation of said second recording means having been waiting for said later recording operation to be started in accordance with a result of detection output by said end-proximity detecting means.

4. A recording apparatus according to claim 3 wherein:

said first recording medium has a control area for recording a length of already recorded data; and said residual-size computing means computes a size of a recordable area on said first recording medium on the basis of said length of already recorded data recorded in said control area of said first recording medium.

5. A recording apparatus according to claim 3 wherein said end-proximity detecting means compares a result of computation output by said residual-size computing means with said predetermined value indicating said location in close proximity to said end point of said recordable area of said first recording medium and determines that said location in close proximity to said end point of said recordable area of said first recording medium has been detected when said result of computation output by said residual-size computing means is found smaller than said predetermined value.

6. A recording apparatus according to claim 1 further having a data-delimiter detecting means for detecting a portion serving as a delimiter of said recorded data between said location in close proximity to said end point of said recordable area of said first recording medium and said end point of said recordable area of said first recording medium.

7. A recording apparatus according to claim 6 wherein said data-delimiter detecting means determines that a portion serving as a delimiter of said recorded data has been detected when the level of a signal representing said recorded data is equal to or lower than a predetermined level continuously for at least a predetermined period of time.

8. A recording apparatus according to claim 1 wherein:

said first recording medium has a control area for recording control information for controlling data already recorded on said first recording medium;

said second recording medium has a control area for recording control information for controlling data already recorded on said second recording medium;

there is provided an address storing means which is used for storing a first address of a recording location of recorded data on said first recording medium and a second address of a recording location of recorded data on said second recording medium whenever said data delimiter detecting means detects a data delimiter in said recorded data in a first zone between said location in close proximity to said end point of said recordable area of said first recording medium and said end point of said recordable area of said first recording medium, or a second zone on said second recording medium in close proximity to said start point of said second recording medium for recording the same recorded data as said first zone;

there is provided a first data erasing means for erasing data in a region in close proximity to said first address by editing said control information recorded in said control area on said first recording medium; and there is provided a second data erasing means for erasing data in a region in close proximity to said second address by editing said control information recorded in said control area on said second recording medium.

9. A recording apparatus according to claim 1 wherein said first recording means stops operating when the size of a recordable area on said first recording medium becomes equal to a predetermined value.

10. A recording apparatus according to claim 1 wherein said wait-state terminating means comprises:

a residual-size computing means for computing a size of a recordable area on said first recording medium;

an extracting means for extracting information on a length of data appended to said recorded data received from said data switching means; and a starting means for starting said later recording operation of said second recording means having been waiting for said later recording operation to be started on the basis of a result of computation output by said residual-size computing means and a data length of a program being recorded extracted by said extracting means.

11. A recording method for preserving recorded data continuously on a plurality of recording mediums in a recording operation even in the event of a switching of said recording operation from any one of said recording mediums to another, said method comprising the steps of:

detecting a location in close proximity to an end point of a recordable area of a first recording medium mounted on a first recording means currently being subjected to an early recording operation; and starting a later recording operation of a second recording means having been waiting for said later recording operation to be started before an arrival of said early recording operation of said first recording means at the said point of said recordable area of said first recording medium.

12. A recording method according to claim 11 whereby data recorded in a zone in close proximity to said end point of said recordable area of said first recording medium mounted on said first recording means is made the same as data recorded in a zone in close proximity to a start point of said recordable area of said second recording medium mounted on said second recording means.

13. A recording method according to claim 11 comprising the steps of:

computing a size of a recordable area on said first recording medium;

comparing said computed size of a recordable area on said first recording medium with a predetermined value indicating said location in close proximity to said end point of said recordable area of said first recording medium to detect an arrival of said early recording operation of said first recording means at said end point of said recordable area of said first recording medium; and starting said later recording operation of said second recording means having been waiting for said later recording operation to be started in accordance with a result of detection of said arrival of said early recording operation of said first recording means at said end point of said recordable area of said first recording medium.

14. A recording method according to claim 13 wherein:

said first recording medium has a control area for recording a length of already recorded data; and at said step of computing a size of a recordable area on said first recording medium, said size is computed on the basis of said length of already recorded data recorded in said control area of said first recording medium.

15. A recording method according to claim 13 whereby a result of computation output at said step of computing a size of a recordable area is compared with said predetermined value indicating said location in close proximity to said end point of said recordable area of said first recording medium, and said location in close proximity to said end point of said recordable area of said first recording medium is determined to have been detected when said result of computation output at said step of computing a size of a recordable area is found smaller than said predetermined value.

16. A recording method according to claim 11 whereby a portion serving as a delimiter of said recorded data is detected between said location in close proximity to said end point of said recordable area of said first recording medium and said end point of said recordable area of said first recording medium.

17. A recording method according to claim 16 whereby a portion serving as a delimiter of said recorded data is determined to have been detected when the level of a signal representing said recorded data is equal to or lower than a predetermined level continuously for at least a predetermined period of time.

18. A recording method according to claim 11 wherein:

said first recording medium has a control area for recording control information for controlling data already recorded on said first recording medium;

said second recording medium has a control area for recording control information for controlling data already recorded on said second recording medium; and said method further has the steps of:

storing a first address of a recording location of recorded data on said first recording medium and a second address of a recording location of recorded data on said second recording medium whenever a data delimiter in said recorded data is detected in a first zone between said location in close proximity to said end point of said recordable area of said first recording medium and said end point of said recordable area of said first recording medium, or a second zone on said second recording medium in close proximity to said start point of said second recording medium for recording the same recorded data as said first zone;

erasing data in a region in close proximity to said first address by editing said control information recorded in said control area on said first recording medium; and erasing step of erasing data in a region in close proximity to said second address by editing said control information recorded in said control area on said second recording medium.

19. A recording method according to claim 11 whereby said first recording means stops operating when the size of a recordable area on said first recording medium becomes equal to a predetermined value.

20. A recording method according to claim 11 comprising the steps of:

computing a size of a recordable area on said first recording medium;

extracting information on a length of data appended to said recorded data; and starting said later recording operation of said second recording means having been waiting for said later recording operation to be started on the basis of said computed size of said recordable area and said extracted information on a length of recorded data.

* * * * *

UNITED STATES PATENT AND TRADEMARK OFFICE

CERTIFICATE OF CORRECTION

PATENT NO. : 6,272,088 B1
DATED : August 7, 2001
INVENTOR(S) : Junichi Aramaki et al.

Page 1 of 1

It is certified that error appears in the above-identified patent and that said Letters Patent is hereby corrected as shown below:

Column 9,
Line 40, change "carried" to -- carrying --.

Column 19,
Line 5, change "MA" to -- M4 --.

Column 24,
Line 5, delete "be".
Line 11, after "unit" insert -- 0 --.
Line 20, change "audiode-compression" to — audio-decompression --.

Column 27,
Line 31, delete "if".

Signed and Sealed this

Eleventh Day of June, 2002

*Attest:*

JAMES E. ROGAN

*Attesting Officer*

*Director of the United States Patent and Trademark Office*